(12) United States Patent
Manpuria et al.

(10) Patent No.: US 9,107,188 B2
(45) Date of Patent: Aug. 11, 2015

(54) QUALITY OF SERVICE (QOS) ACQUISITION AND PROVISIONING WITHIN A WIRELESS COMMUNICATIONS SYSTEM

(71) Applicant: QUALCOMM Incorporated, San Diego, CA (US)

(72) Inventors: Vivek Manpuria, San Diego, CA (US); Ashu Razdan, San Diego, CA (US); Arulmozhi Ananthanarayanan, San Diego, CA (US); Eric Carl Rosen, Solana Beach, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 14/325,062

(22) Filed: Jul. 7, 2014

(65) Prior Publication Data

US 2014/0321393 A1 Oct. 30, 2014

Related U.S. Application Data

(62) Division of application No. 13/025,874, filed on Feb. 11, 2011, now Pat. No. 8,804,518.

(60) Provisional application No. 61/308,768, filed on Feb. 26, 2010.

(51) Int. Cl.
| | | |
|---|---|---|
| *H04L 12/28* | (2006.01) | |
| *H04J 3/24* | (2006.01) | |
| *H04M 3/00* | (2006.01) | |
| *G06F 15/16* | (2006.01) | |
| *H04W 72/00* | (2009.01) | |
| *H04W 36/00* | (2009.01) | |
| *H04W 76/02* | (2009.01) | |
| *H04W 4/10* | (2009.01) | |
| *H04W 8/26* | (2009.01) | |
| *H04W 76/00* | (2009.01) | |

(52) U.S. Cl.
CPC ........ *H04W 72/005* (2013.01); *H04W 36/0011* (2013.01); *H04W 76/027* (2013.01); *H04W 4/10* (2013.01); *H04W 8/26* (2013.01); *H04W 76/005* (2013.01)

(58) Field of Classification Search
CPC ......... H04W 4/00; H04W 4/001; H04W 4/02; H04W 4/023; H04W 4/06; H04W 4/08; H04W 4/10; H04W 4/12; H04W 4/18; H04W 4/206; H04W 8/186; H04W 28/0231; H04W 28/0268; H04W 36/0011; H04W 36/026; H04W 36/14; H04W 68/00; H04W 72/005; H04W 72/0406; H04W 76/002; H04W 76/005; H04W 76/02; H04W 76/045; H04W 84/12; H04L 12/185; H04L 12/189; H04L 12/1818; H04L 12/1822; H04L 29/06414; H04L 29/06442; H04L 29/12292; H04L 51/046; H04L 61/2069; H04L 63/065; H04L 63/104; H04L 65/80; H04L 65/103; H04L 65/403; H04L 65/1006; H04L 65/1016; H04L 65/1063; H04L 65/1066; H04L 65/1069; H04L 67/14; H04L 67/141; H04L 67/322; H04L 67/1044; H04M 3/56; H04M 15/8072; H04M 15/8077; H04M 15/8228; H04M 2215/7485; H04M 2215/7492; H04M 2215/7833; H04N 21/6405; H04N 21/25808
USPC ......... 370/229–230, 235, 259–260, 270–297, 370/390, 392–393, 400–401, 431–432, 370/474–475; 455/414.1, 416, 418; 709/204, 220–229, 244
See application file for complete search history.

(56) References Cited

U.S. PATENT DOCUMENTS

| | | |
|---|---|---|
| 6,690,920 B2 | 2/2004 | Saarinen et al. |
| 6,920,499 B2 | 7/2005 | Chen |
| 7,050,396 B1 | 5/2006 | Cohen et al. |
| 7,391,724 B2 | 6/2008 | Alakoski et al. |
| 8,131,853 B2 | 3/2012 | McDysan et al. |
| 8,184,533 B2 | 5/2012 | Jin et al. |
| 8,213,310 B2 | 7/2012 | Santhanam et al. |
| 8,325,658 B2 | 12/2012 | Rosen et al. |
| 8,412,829 B2 * | 4/2013 | Keller et al. .................. 709/227 |
| 8,433,783 B2 | 4/2013 | Jackowski et al. |

| | | | |
|---|---|---|---|
| 8,654,686 B2* | 2/2014 | Anchan | 370/279 |
| 8,666,406 B2* | 3/2014 | Dhodapkar | 455/435.1 |
| 8,675,553 B2 | 3/2014 | Song et al. | |
| 8,707,391 B2* | 4/2014 | Song et al. | 726/3 |
| 8,731,535 B2* | 5/2014 | Goel et al. | 455/418 |
| 8,804,518 B2* | 8/2014 | Manpuria et al. | 370/235 |
| 2003/0135626 A1 | 7/2003 | Ray et al. | |
| 2005/0207368 A1 | 9/2005 | Nam | |
| 2006/0015354 A1 | 1/2006 | Shrum, Jr. et al. | |
| 2006/0040694 A1 | 2/2006 | Yoon et al. | |
| 2006/0245407 A1 | 11/2006 | Chen et al. | |
| 2006/0264220 A1 | 11/2006 | Chen et al. | |
| 2006/0274692 A1 | 12/2006 | Ryu | |
| 2007/0058561 A1 | 3/2007 | Virgile | |
| 2007/0143483 A1 | 6/2007 | Lim et al. | |
| 2007/0153769 A1 | 7/2007 | Comstock et al. | |
| 2007/0160045 A1 | 7/2007 | Payyappilly et al. | |
| 2007/0195788 A1 | 8/2007 | Vasamsetti et al. | |
| 2008/0008195 A1 | 1/2008 | Oberle et al. | |
| 2008/0014395 A1 | 1/2008 | Balasubramanian | |
| 2008/0261598 A1 | 10/2008 | Tinnakornsrisuphap et al. | |
| 2009/0005054 A1 | 1/2009 | Moritomo et al. | |
| 2009/0022106 A1 | 1/2009 | Ue et al. | |
| 2009/0080357 A1 | 3/2009 | Song et al. | |
| 2009/0080396 A1 | 3/2009 | Song et al. | |
| 2009/0185527 A1 | 7/2009 | Akhtar et al. | |
| 2009/0279510 A1 | 11/2009 | Ahn et al. | |
| 2009/0280849 A1 | 11/2009 | Rosen et al. | |
| 2009/0303878 A1 | 12/2009 | Savarkar et al. | |
| 2010/0004012 A1 | 1/2010 | Ananthanarayanan et al. | |
| 2010/0008244 A1 | 1/2010 | Sampath et al. | |
| 2010/0074109 A1 | 3/2010 | Klingenbrunn et al. | |
| 2010/0172306 A1 | 7/2010 | Gill et al. | |
| 2010/0226252 A1 | 9/2010 | Gogic et al. | |
| 2010/0329225 A1 | 12/2010 | Balasubramanian | |
| 2011/0019637 A1 | 1/2011 | Ojala et al. | |
| 2011/0021202 A1 | 1/2011 | Rosen et al. | |
| 2011/0107169 A1 | 5/2011 | Loehr et al. | |
| 2011/0211439 A1 | 9/2011 | Manpuria et al. | |
| 2014/0370895 A1* | 12/2014 | Pandey et al. | 455/436 |

FOREIGN PATENT DOCUMENTS

| | | | |
|---|---|---|---|
| EP | 1643690 A1 | 4/2006 | |
| KR | 20070073432 A | 7/2007 | |
| WO | WO-2008008990 | 1/2008 | |
| WO | WO-2008039973 A1 | 4/2008 | |
| WO | WO-2008040023 A2 | 4/2008 | |
| WO | WO-2009042525 A2 | 4/2009 | |
| WO | WO-2009140113 A1 | 11/2009 | |
| WO | WO-2009148775 A1 | 12/2009 | |
| WO | WO-2011106211 | 9/2011 | |

OTHER PUBLICATIONS

3GPP2: "VoIP Codecs and Protocols—3GPP2 C.S0085-A—Version 1.0", Jan. 27, 2010, pp. 1-31, XP55002296, ftp://ftp.3gpp2.org/TSGC/Working/2010/2010 -01-Bangkok/TSG-C-2010-01-Bangkok/WG1/ Retrieved from the Internet: URL:ftp://ftp.3gpp2.org/TSGC/Working/2010/ 2010-01-Bangkok/TSG-C-2010-01-Bangkok/WG1/ [retrieved on Jul. 7, 2011].

3rd Generation Partnership Project; Technical Specification Group (TSG) RAN; RAB Quality of Service Negotiation over Iu (Release 4), 3GPP Standard; 3GPP TR 25.946, 3rd Generation Partnership Project (3GPP), Mobile Competence Centre ; 650, Route Des Lucioles ; F-06921 Sophia-Antipolis Cedex ; France, No. V4.0.0, Mar. 1, 2001, pp. 1-18, XP050369549.

Anonymous: 3GPP2-Drafts, 2500 Wilson Boulevard, Suite 300, Arlington, Virginia 22201, USA 0RD-0000-00-00, Jun. 30, 2008, XP040480130.

Engineering Services Group—Qualcomm: "1xEV-DO Revision A Over-the-Air QoS Configuration Example; Aug. 30, 2007; 80-W1102-1 Rev B", Aug. 30, 2007, pp. 1-59, XP55002297, Retrieved from the Internet: URL:http://www.qualcomm.com/common/documents/white_papers/ESG_EVDO_RevA.pdf [retrieved on Jul. 7, 2011].

European Search Report—EP13163396—Search Authority—Munich—Jun. 19, 2013.

European Search Report—EP13163401—Search Authority—Munich—Jun. 20, 2013.

European Search Report—EP13163403—Search Authority—Munich—Jun. 20, 2013.

IEEE, Piscataway, NJ, USA, Feb. 29, 2008, XP040393795.

International Search Report and Written Opinion—PCT/US2010/043421—ISA/EPO—May 10, 2011.

International Search Report and Written Opinion—PCT/US2011/024968—ISA/EPO—Jul. 27, 2011.

Lee, S., et al., "Seamless QoS Guarantees in Mobile Internet Using NSIS with Advance Resource Reservation", Advanced Information Networking and Applications, 2008, AINA 2008, 22nd International Conference on, IEEE, Piscataway, NJ, USA , Mar. 25, 2008, pp. 464-471, XP031240672.

Lucent Technologies: "High-Level Flow for Priority Services and Definitions", 3GPP2-Drafts, 2500 Wilson Boulevard, Suite 300, Arlington, Virginia 22201 USA, Sep. 11, 2006, XP040267183.

"Qos Interoperability and Policy Management Recommendations", 36 Americas—QoS Interoperability and Policy Management Recommendations, Dec. 31, 2007, pp. 1-29, XP002607416, Retrieved from the Internet: URL: http://www.3gamericas.org/documents/3GAmericas_QoSPolicy_Dec19-07.pdf [retrieved on Oct. 27, 2010] Section 1.2, Section 1.5, Section 3.1.

* cited by examiner

*Primary Examiner* — Tri H Phan

(74) *Attorney, Agent, or Firm* — Michael F. Taveira

(57) ABSTRACT

In an embodiment, an access network (AN) receives a message configured to prompt a conditional allocation of Quality of Service (QoS) resources to an access terminal (AT). The message can be received from the AT or from an application server (AS) that arbitrates a communication session for the AT. In another embodiment, if the AT determines that a QoS resource request has not yet been granted, the AT waits until the traffic channel (TCH) has been obtained for a communication session before resending the QoS resource request. In another embodiment, if the AT determines to initiate or join a second communication session before a confirmation that QoS resources for a first communication session are relinquished, the AT waits until the confirmation is received before a request for QoS resources for the second communication session is sent.

30 Claims, 24 Drawing Sheets

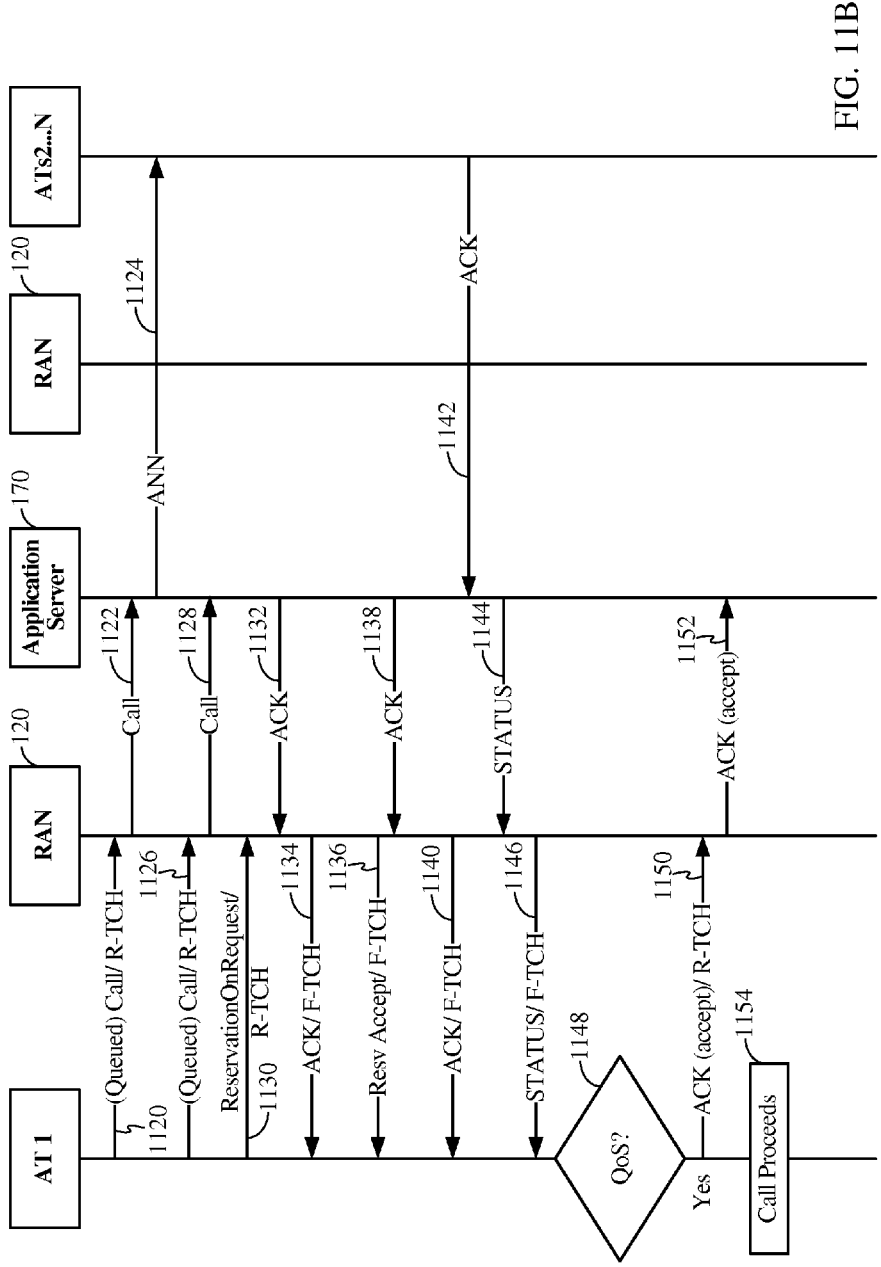

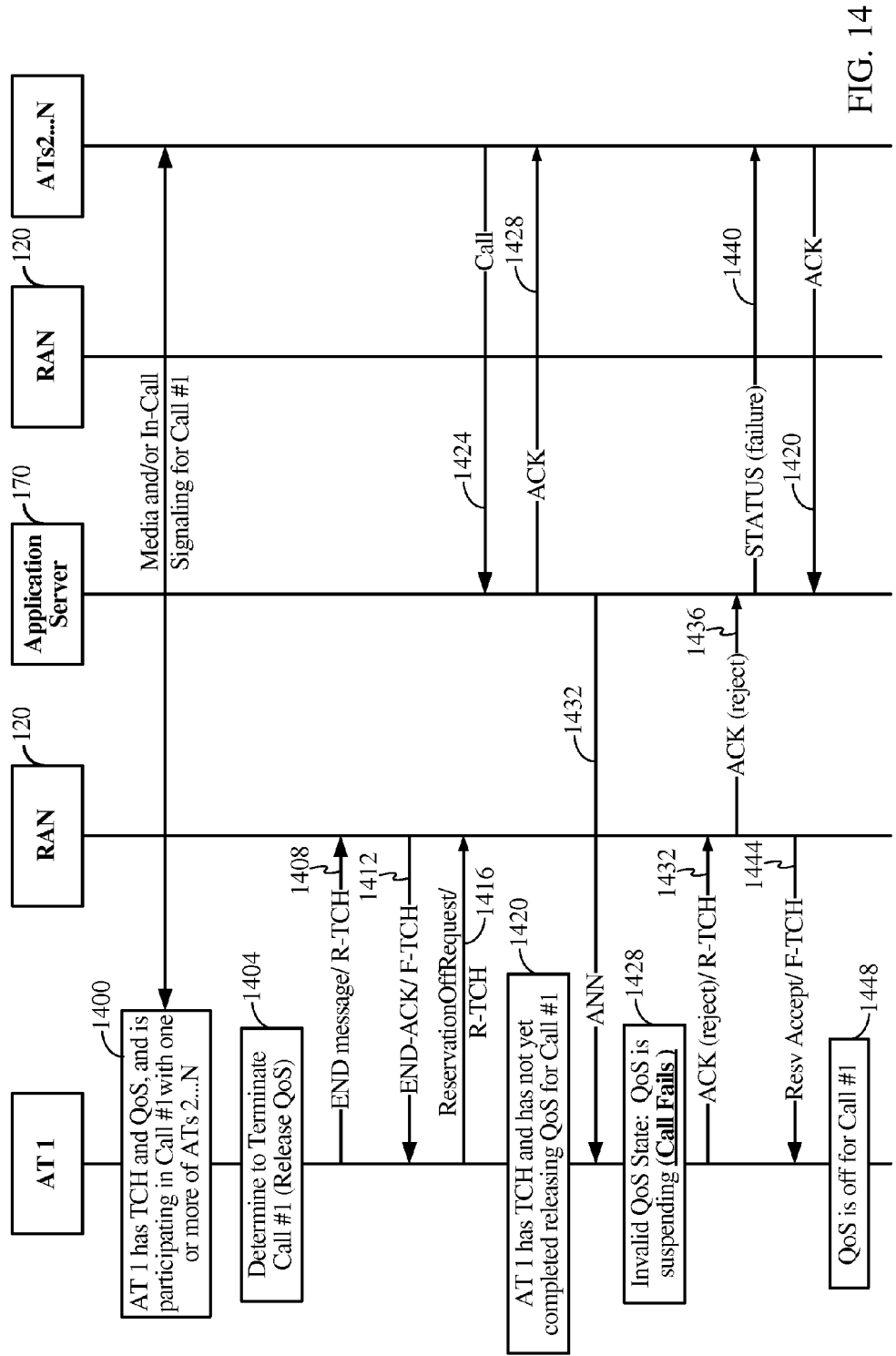

QUALITY OF SERVICE (QOS) ACQUISITION AND PROVISIONING WITHIN A WIRELESS COMMUNICATIONS SYSTEM

CROSS REFERENCE TO RELATED APPLICATIONS

The present Application for Patent is a Divisional of Non-Provisional Application No. 13/025,874, entitled "QUALITY OF SERVICE (QoS) ACQUISITION AND PROVISIONING WITHIN A WIRELESS COMMUNICATIONS SYSTEM", filed on Feb. 11, 2011, which in turn claims priority to Provisional Application No. 61/308,768 entitled "QUALITY OF SERVICE (QoS) ACQUISITION AND PROVISIONING WITHIN A WIRELESS COMMUNICATIONS SYSTEM", filed on Feb. 26, 2010, each of which is assigned to the assignee hereof and each of which is hereby expressly incorporated by reference herein in its entirety.

The present Application for Patent is also related to U.S. Pat. No. 8,325,658 having application Ser. No. 12/509,980, entitled "QUALITY OF SERVICE (QoS) RESOURCES WITHIN A WIRELESS COMMUNICATIONS SYSTEM", filed on Jul. 27, 2009 and issued on Dec. 4, 2012, assigned to the assignee hereof, and expressly incorporated by reference herein in its entirety.

BACKGROUND OF THE INVENTION

1. Field of the Invention

Embodiments relate to Quality of Service (QoS) resource allocation for communication sessions within a wireless communications system.

2. Background

Wireless communication systems have developed through various generations, including a first-generation analog wireless phone service (1G), a second-generation (2G) digital wireless phone service (including interim 2.5G and 2.75G networks) and a third-generation (3G) high speed data/Internet-capable wireless service. There are presently many different types of wireless communication systems in use, including Cellular and Personal Communications Service (PCS) systems. Examples of known cellular systems include the cellular Analog Advanced Mobile Phone System (AMPS), and digital cellular systems based on Code Division Multiple Access (CDMA), Frequency Division Multiple Access (FDMA), Time Division Multiple Access (TDMA), the Global System for Mobile access (GSM) variation of TDMA, and newer hybrid digital communication systems using both TDMA and CDMA technologies.

The method for providing CDMA mobile communications was standardized in the United States by the Telecommunications Industry Association/Electronic Industries Association in TIA/EIA/IS-95-A entitled "Mobile Station-Base Station Compatibility Standard for Dual-Mode Wideband Spread Spectrum Cellular System," referred to herein as IS-95. Combined AMPS & CDMA systems are described in TIA/EIA Standard IS-98. Other communications systems are described in the IMT-2000/UM, or International Mobile Telecommunications System 2000/Universal Mobile Telecommunications System, standards covering what are referred to as wideband CDMA (WCDMA), CDMA2000 (such as CDMA2000 1xEV-DO standards, for example) or TD-SCDMA.

In wireless communication systems, mobile stations, handsets, or access terminals (AT) receive signals from fixed position base stations (also referred to as cell sites or cells) that support communication links or service within particular geographic regions adjacent to or surrounding the base stations. Base stations provide entry points to an access network (AN)/radio access network (RAN), which is generally a packet data network using standard Internet Engineering Task Force (IETF) based protocols that support methods for differentiating traffic based on Quality of Service (QoS) requirements. Therefore, the base stations generally interact with ATs through an over the air interface and with the AN through Internet Protocol (IP) network data packets.

In wireless telecommunication systems, Push-to-talk (PTT) capabilities are becoming popular with service sectors and consumers. PTT can support a "dispatch" voice service that operates over standard commercial wireless infrastructures, such as CDMA, FDMA, TDMA, GSM, etc. In a dispatch model, communication between endpoints (ATs) occurs within virtual groups, wherein the voice of one "talker" is transmitted to one or more "listeners." A single instance of this type of communication is commonly referred to as a dispatch call, or simply a PTT call. A PTT call is an instantiation of a group, which defines the characteristics of a call. A group in essence is defined by a member list and associated information, such as group name or group identification.

Conventionally, data packets within a wireless communications network have been configured to be sent to a single destination or access terminal. A transmission of data to a single destination is referred to as "unicast". As mobile communications have increased, the ability to transmit given data concurrently to multiple access terminals has become more important. Accordingly, protocols have been adopted to support concurrent data transmissions of the same packet or message to multiple destinations or target access terminals. A "broadcast" refers to a transmission of data packets to all destinations or access terminals (e.g., within a given cell, served by a given service provider, etc.), while a "multicast" refers to a transmission of data packets to a given group of destinations or access terminals. In an example, the given group of destinations or "multicast group" may include more than one and less than all of possible destinations or access terminals (e.g., within a given group, served by a given service provider, etc.). However, it is at least possible in certain situations that the multicast group comprises only one access terminal, similar to a unicast, or alternatively that the multicast group comprises all access terminals (e.g., within a cell or sector), similar to a broadcast.

Broadcasts and/or multicasts may be performed within wireless communication systems in a number of ways, such as performing a plurality of sequential unicast operations to accommodate the multicast group, allocating a unique broadcast/multicast channel (BCH) for handling multiple data transmissions at the same time and the like. A conventional system using a broadcast channel for push-to-talk communications is described in United States Patent Application Publication No. 2007/0049314 dated Mar. 1, 2007 and entitled "Push-To-Talk Group Call System Using CDMA 1x-EVDO Cellular Network", the contents of which are incorporated herein by reference in its entirety. As described in Publication No. 2007/0049314, a broadcast channel can be used for push-to-talk calls using conventional signaling techniques. Although the use of a broadcast channel may improve bandwidth requirements over conventional unicast techniques, the conventional signaling of the broadcast channel can still result in additional overhead and/or delay and may degrade system performance.

The 3rd Generation Partnership Project 2 ("3GPP2") defines a broadcast-multicast service (BCMCS) specification for supporting multicast communications in CDMA2000 networks. Accordingly, a version of 3GPP2's BCMCS specification, entitled "CDMA2000 High Rate Broadcast-Multicast Packet Data Air Interface Specification", dated Feb. 14, 2006, Version 1.0 C.S0054-A, is hereby incorporated by reference in its entirety.

SUMMARY

In an embodiment, an access network (AN) receives a message configured to prompt a conditional allocation of Quality of Service (QoS) resources to an access terminal (AT). The message can be received from the AT or from an application server (AS) that arbitrates a communication session for the AT. In another embodiment, if the AT determines that a QoS resource request has not yet been granted, the AT waits until the traffic channel (TCH) has been obtained for a communication session before resending the QoS resource request. In another embodiment, if the AT determines to initiate or join a second communication session before a confirmation that QoS resources for a first communication session are relinquished, the AT waits until the confirmation is received before a request for QoS resources for the second communication session is sent.

BRIEF DESCRIPTION OF THE DRAWINGS

A more complete appreciation of embodiments of the invention and many of the attendant advantages thereof will be readily obtained as the same becomes better understood by reference to the following detailed description when considered in connection with the accompanying drawings which are presented solely for illustration and not limitation of the invention, and in which:

FIGS. 8A and 8B, FIGS. 9A and 9B, FIGS. 10A and 10B and FIGS. 11A and 11B each illustrate a communication setup process according to different embodiments of the invention.

FIG. 14 and FIGS. 15A and 15B each illustrate another setup process for a second of back-to-back communication sessions according to different embodiments of the invention.

DETAILED DESCRIPTION

Figure 1A:
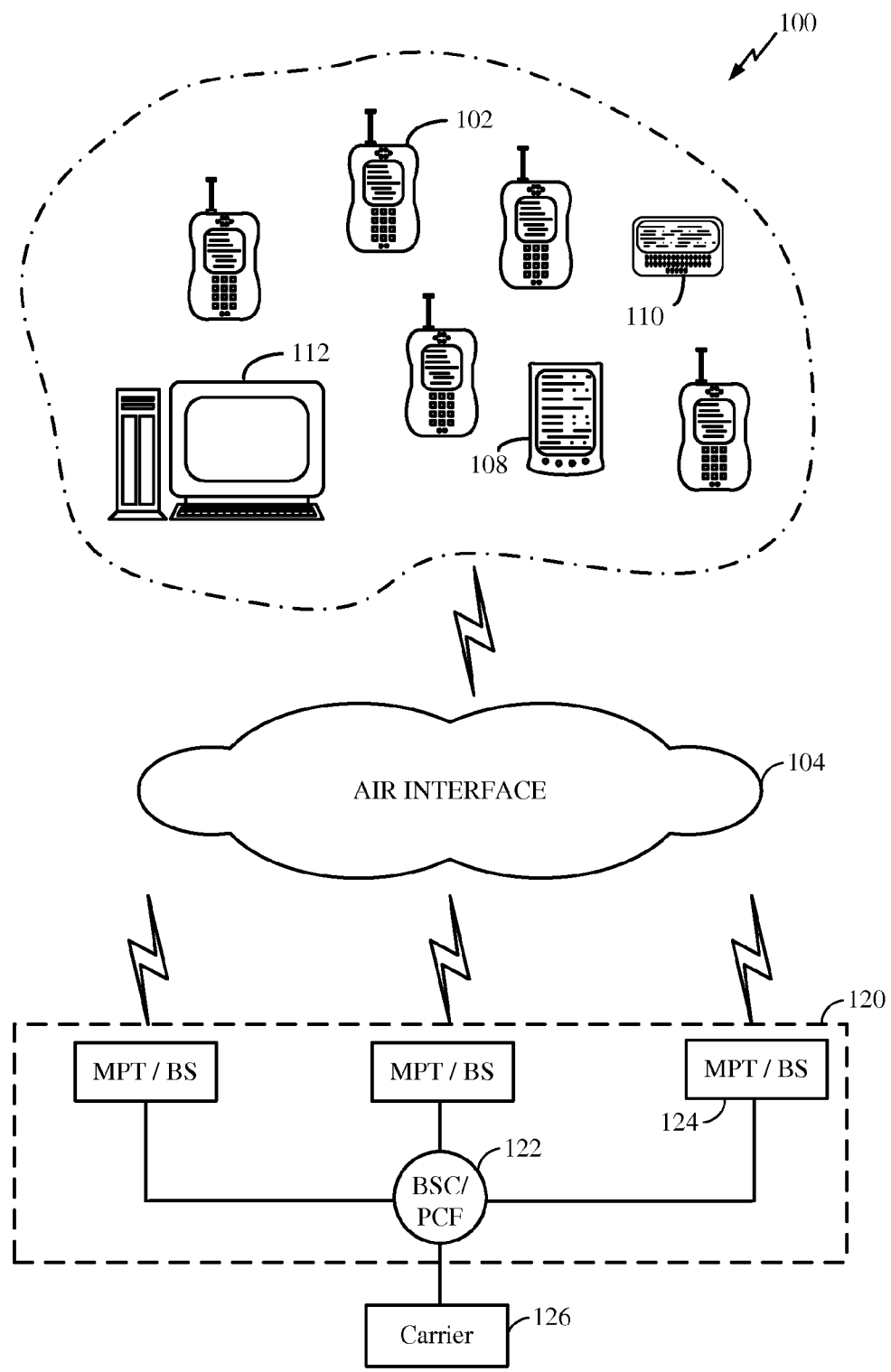
FIG. 1A is a diagram of a wireless network architecture that supports access terminals and access networks in accordance with at least one embodiment of the invention.

Aspects of the invention are disclosed in the following description and related drawings directed to specific embodiments of the invention. Alternate embodiments may be devised without departing from the scope of the invention. Additionally, well-known elements of the invention will not be described in detail or will be omitted so as not to obscure the relevant details of the invention.

The word "exemplary" is used herein to mean "serving as an example, instance, or illustration." Any embodiment described herein as "exemplary" is not necessarily to be construed as preferred or advantageous over other embodiments. Likewise, the term "embodiments of the invention" does not require that all embodiments of the invention include the discussed feature, advantage or mode of operation.

Further, many embodiments are described in terms of sequences of actions to be performed by, for example, elements of a computing device. It will be recognized that various actions described herein can be performed by specific circuits (e.g., application specific integrated circuits (ASICs)), by program instructions being executed by one or more processors, or by a combination of both. Additionally, these sequence of actions described herein can be considered to be embodied entirely within any form of computer readable storage medium having stored therein a corresponding set of computer instructions that upon execution would cause an associated processor to perform the functionality described herein. Thus, the various aspects of the invention may be embodied in a number of different forms, all of which have been contemplated to be within the scope of the claimed subject matter. In addition, for each of the embodiments described herein, the corresponding form of any such embodiments may be described herein as, for example, "logic configured to" perform the described action.

A High Data Rate (HDR) subscriber station (e.g. a 1xEV-DO enabled wireless device), referred to herein as an access terminal (AT), may be mobile or stationary, and may communicate with one or more HDR base stations, referred to herein as modem pool transceivers (MPTs) or base stations (BS). An access terminal transmits and receives data packets through one or more modem pool transceivers to an HDR base station controller, referred to as a modem pool controller (MPC), base station controller (BSC) and/or mobile switching center (MSC). Modem pool transceivers and modem pool controllers are parts of a network called an access network. An access network (AN) (also referred to herein as a radio access network (RAN)) transports data packets between multiple access terminals.

The access network may be further connected to additional networks outside the access network, such as a corporate intranet or the Internet, and may transport data packets between each access terminal and such outside networks. An access terminal that has established an active traffic channel connection with one or more modem pool transceivers is called an active access terminal, and is said to be in a traffic state. An access terminal that is in the process of establishing an active traffic channel connection with one or more modem pool transceivers is said to be in a connection setup state. An access terminal may be any data device that communicates through a wireless channel or through a wired channel, for example using fiber optic or coaxial cables. An access terminal may further be any of a number of types of devices including but not limited to PC card, compact flash, external or internal modem, or wireless or wireline phone. The communication link through which the access terminal sends signals to the modem pool transceiver is called a reverse link or traffic channel. The communication link through which a modem pool transceiver sends signals to an access terminal is called a forward link or traffic channel. As used herein the term traffic channel can refer to either a forward or reverse traffic channel.

FIG. 1A illustrates a block diagram of one exemplary embodiment of a wireless system 100 in accordance with at least one embodiment of the invention. System 100 can contain access terminals, such as cellular telephone 102, in communication across an air interface 104 with an access network (AN) 120 or radio access network (RAN) 120 that can connect the access terminal 102 to network equipment providing data connectivity between a packet switched data network (e.g., an intranet, the Internet, and/or carrier network 126) and the access terminals 102, 108, 110, 112. Below, references are made interchangeably between the AN 120 and the RAN 120. As shown here, the access terminal can be a cellular telephone 102, a personal digital assistant 108, a pager 110, which is shown here as a two-way text pager, or even a separate computer platform 112 that has a wireless communication portal. Embodiments of the invention can thus be realized on any form of access terminal including a wireless communication portal or having wireless communication capabilities, including without limitation, wireless modems, PCMCIA cards, personal computers, telephones, or any combination or subcombination thereof. Further, as used herein, the terms "access terminal", "wireless device", "client device", "mobile terminal" and variations thereof may be used interchangeably.

Referring back to FIG. 1A, the components of the wireless network 100 and interrelation of the elements of the exemplary embodiments of the invention are not limited to the configuration illustrated. System 100 is merely exemplary and can include any system that allows remote access terminals, such as wireless client computing devices 102, 108, 110, 112 to communicate over-the-air between and among each other and/or between and among components connected via the air interface 104 and RAN 120, including, without limitation, carrier network 126, the Internet, and/or other remote servers.

The RAN 120 controls messages (typically sent as data packets) sent to a base station controller/packet control function (BSC/PCF) 122. The BSC/PCF 122 is responsible for signaling, establishing, and tearing down bearer channels (i.e., data channels) between a packet data service node 160 ("PDSN") (e.g., shown in FIG. 1B) and the access terminals 102/108/110/112. If link layer encryption is enabled, the BSC/PCF 122 also encrypts the content before forwarding it over the air interface 104. The function of the BSC/PCF 122 is well-known in the art and will not be discussed further for the sake of brevity. The carrier network 126 may communicate with the BSC/PCF 122 by a network, the Internet and/or a public switched telephone network (PSTN). Alternatively, the BSC/PCF 122 may connect directly to the Internet or external network. Typically, the network or Internet connection between the carrier network 126 and the BSC/PCF 122 transfers data, and the PSTN transfers voice information. The BSC/PCF 122 can be connected to multiple base stations (BS) or modem pool transceivers (MPT) 124. In a similar manner to the carrier network, the BSC/PCF 122 is typically connected to the MPT/BS 124 by a network, the Internet and/or PSTN for data transfer and/or voice information. The MPT/BS 124 can broadcast data messages wirelessly to the access terminals, such as cellular telephone 102. The MPT/BS 124, BSC/PCF 122 and other components may form the RAN 120, as is known in the art. However, alternate configurations may also be used and the invention is not limited to the configuration illustrated. For example, in another embodiment the functionality of the BSC/PCF 122 and one or more of the MPT/BS 124 may be collapsed into a single "hybrid" module having the functionality of both the BSC/PCF 122 and the MPT/BS 124.

Figure 1B:
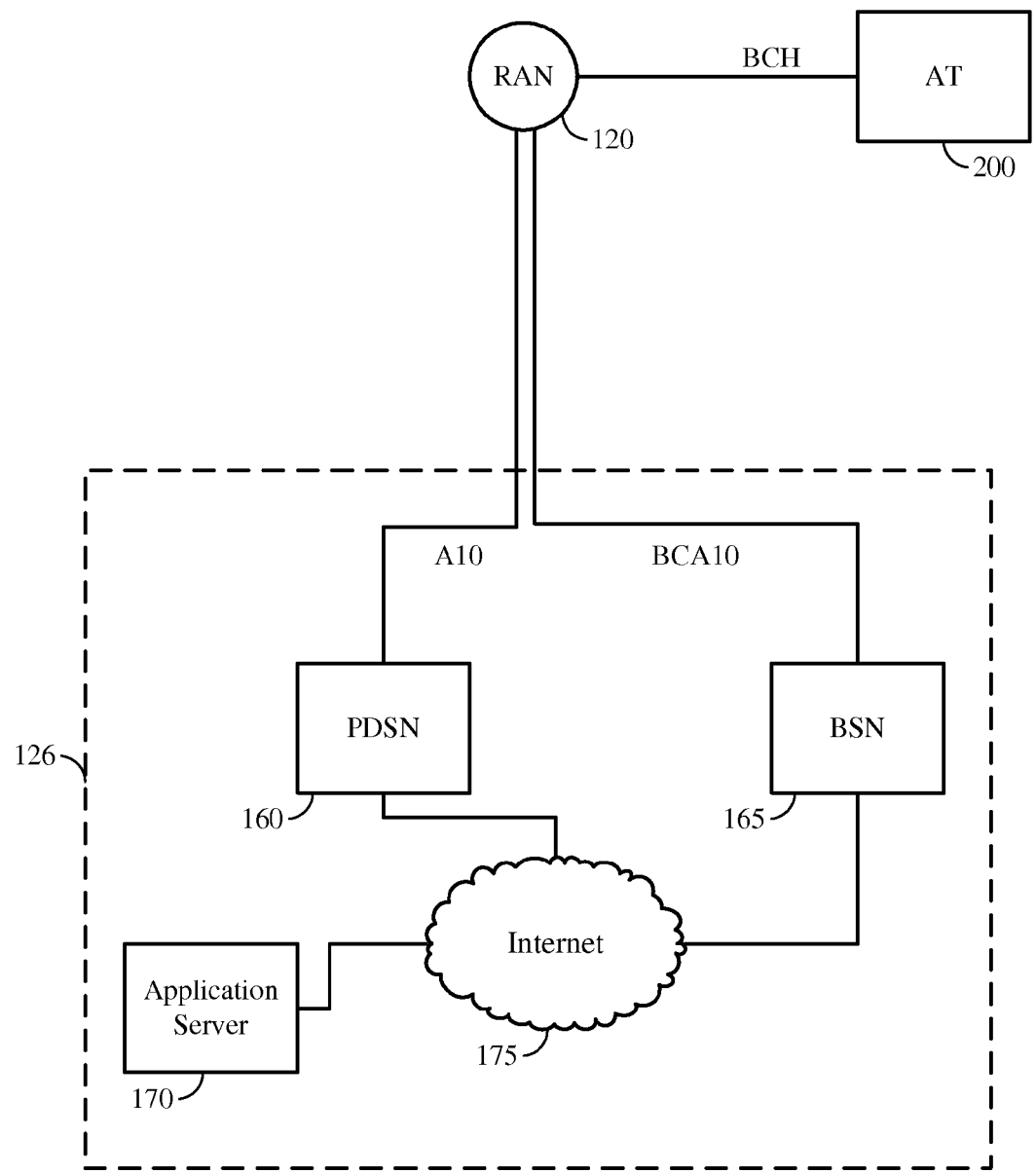
FIG. 1B illustrates the carrier network according to an example embodiment of the present invention.

FIG. 1B illustrates the carrier network 126 according to an embodiment of the present invention. In the embodiment of FIG. 1B, the carrier network 126 includes a packet data serving node (PDSN) 160, a broadcast serving node (BSN) 165, an application server 170 and an Internet 175. However, application server 170 and other components may be located outside the carrier network in alternative embodiments. The PDSN 160 provides access to the Internet 175, intranets and/or remote servers (e.g., application server 170) for mobile stations (e.g., access terminals, such as 102, 108, 110, 112 from FIG. 1A) utilizing, for example, a cdma2000 Radio Access Network (RAN) (e.g., RAN 120 of FIG. 1A). Acting as an access gateway, the PDSN 160 may provide simple IP and mobile IP access, foreign agent support, and packet transport. The PDSN 160 can act as a client for Authentication, Authorization, and Accounting (AAA) servers and other supporting infrastructure and provides mobile stations with a gateway to the IP network as is known in the art. As shown in FIG. 1B, the PDSN 160 may communicate with the RAN 120 (e.g., the BSC/PCF 122) via a conventional A10 connection. The A10 connection is well-known in the art and will not be described further for the sake of brevity.

Referring to FIG. 1B, the broadcast serving node (BSN) 165 may be configured to support multicast and broadcast services. The BSN 165 will be described in greater detail below. The BSN 165 communicates with the RAN 120 (e.g., the BSC/PCF 122) via a broadcast (BC) A10 connection, and with the application server 170 via the Internet 175. The BCA10 connection is used to transfer multicast and/or broadcast messaging. Accordingly, the application server 170 sends unicast messaging to the PDSN 160 via the Internet 175, and sends multicast messaging to the BSN 165 via the Internet 175.

Figure 2:
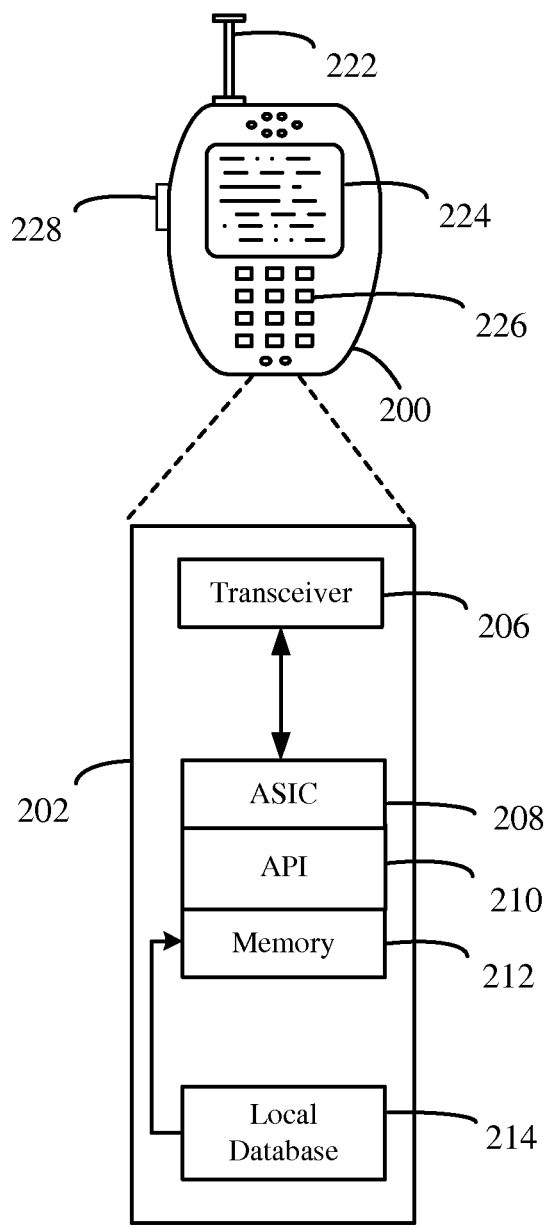
FIG. 2 is an illustration of an access terminal in accordance with at least one embodiment of the invention.

Referring to FIG. 2, the access terminal 200, (here a wireless device), such as a cellular telephone, has a platform 202 that can receive and execute software applications, data and/or commands transmitted from the RAN 120 that may ultimately come from the carrier network 126, the Internet and/or other remote servers and networks. The platform 202 can include a transceiver 206 operably coupled to an application specific integrated circuit ("ASIC" 208), or other processor, microprocessor, logic circuit, or other data processing device. The ASIC 208 or other processor executes the application programming interface ("API") 210 layer that interfaces with any resident programs in the memory 212 of the wireless device. The memory 212 can be comprised of read-only or random-access memory (RAM and ROM), EEPROM, flash cards, or any memory common to computer platforms. The platform 202 also can include a local database 214 that can hold applications not actively used in memory 212. The local database 214 is typically a flash memory cell, but can be any secondary storage device as known in the art, such as magnetic media, EEPROM, optical media, tape, soft or hard disk, or the like. The internal platform 202 components can also be operably coupled to external devices such as antenna 222, display 224, push-to-talk button 228 and keypad 226 among other components, as is known in the art.

Accordingly, an embodiment of the invention can include an access terminal including the ability to perform the functions described herein. For example, the access terminal can include logic configured to bundle a connection request and a reservation for QoS resources into an access message and logic configured to transmit the access message to an access network. As will be appreciated by those skilled in the art, the various logic elements can be embodied in discrete elements, software modules executed on a processor or any combination of software and hardware to achieve the functionality disclosed herein. For example, ASIC 208, memory 212, API 210 and local database 214 may all be used cooperatively to load, store and execute the various functions disclosed herein and thus the logic to perform these functions may be distributed over various elements. Alternatively, the functionality could be incorporated into one discrete component. Therefore, the features of the access terminal in FIG. 2 are to be considered merely illustrative and the invention is not limited to the illustrated features or arrangement.

The wireless communication between the access terminal 102 and the RAN 120 can be based on different technologies, such as code division multiple access (CDMA), time division multiple access (TDMA), frequency division multiple access (FDMA), the Global System for Mobile Communications (GSM), or other protocols that may be used in a wireless communications network or a data communications network. The data communication is typically between the client device 102, MPT/BS 124, and BSC/PCF 122. The BSC/PCF 122 can be connected to multiple data networks such as the carrier network 126, PSTN, the Internet, a virtual private network, and the like, thus allowing the access terminal 102 access to a broader communication network. As discussed in the foregoing and known in the art, voice transmission and/or data can be transmitted to the access terminals from the access network using a variety of networks and configurations. Accordingly, the illustrations provided herein are not intended to limit the embodiments of the invention and are merely to aid in the description of aspects of embodiments of the invention.

Figure 3A:
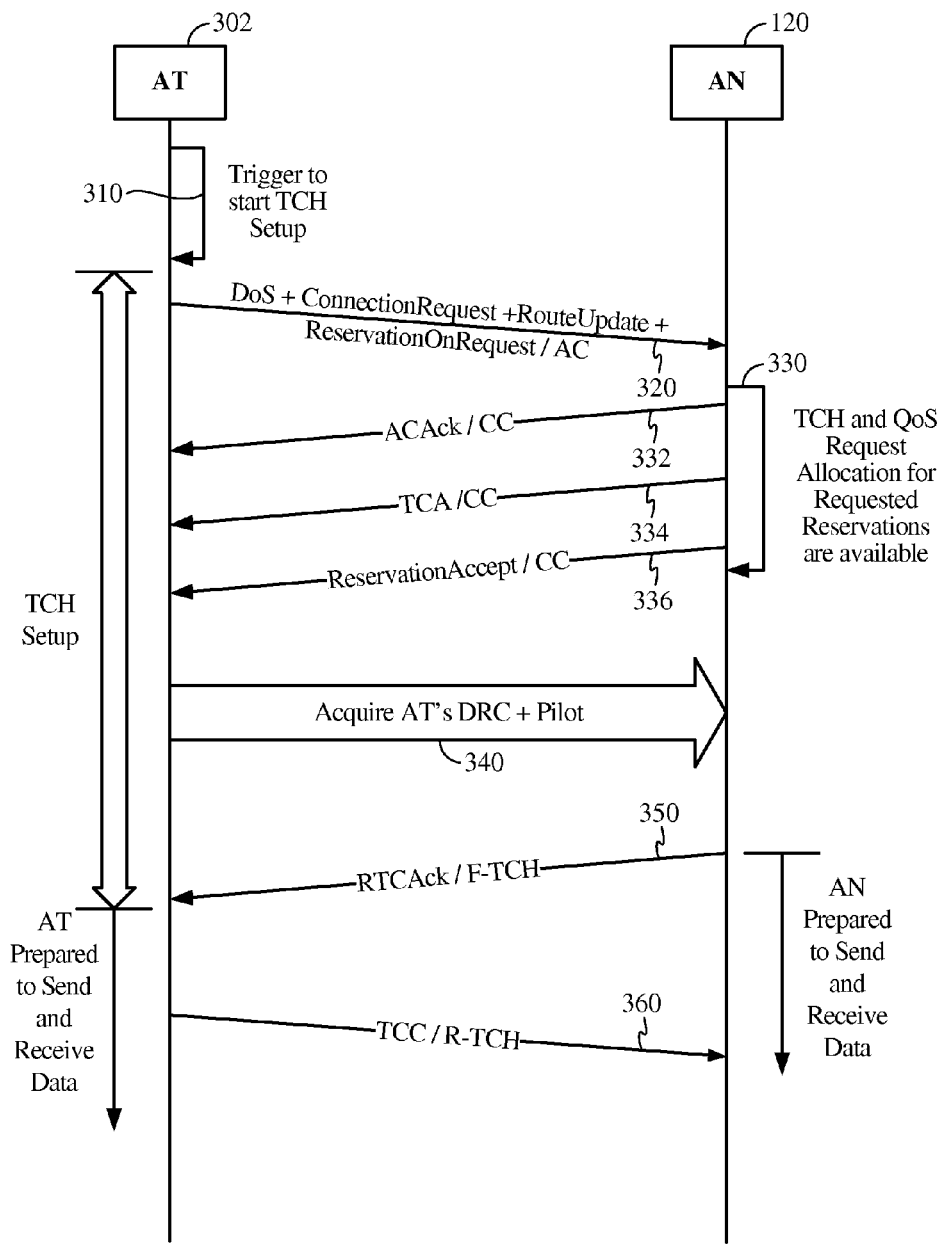
FIGS. 3A-3C illustrate signal flow diagrams in accordance with embodiments of the invention.

FIG. 3A illustrates a flow diagram for bundling communications in accordance with embodiments of the invention. In 310, there is an initial trigger at an access terminal (AT) 302 to establish the communication request (e.g., a PTT button 228 is pressed) and the information needed to establish the communication with the access network (AN) 120 is bundled into an access channel message (e.g., a connection request (ConnectionRequest and route update information (RouteUpdate)), provisioning for any QoS services used for the communication (ReservationOnRequest), etc.). Additionally, application layer data (e.g. a DataOverSignaling (DOS) message) may also be bundled in the access channel message to expedite communication with an end application (e.g., the group server, application resident on another AT, etc.) Once the access message is bundled with the desired information (e.g., DOS+ConnectionRequest+RouteUpdate+ReservationOnRequest), the access message can be sent 320 over the access channel (AC) to the access network (AN) 120.

Once the bundled message 320 is received at the access network 120, the access network can process the request 330. In 330, the access network can allocate a traffic channel (TCH) and the requested QoS resources for the requested reservations, assuming the traffic channel and QoS resources are available. Specifically, the access network 120 can acknowledge the access message (ACAck), 332, transmit a traffic channel assignment (TCA), 334, and transmit a reservation accept message (ReservationAccept), 336. These messages can be transmitted on a control channel (CC) to AT 302. A data rate control (DRC) message can be sent, 340, from the AT 302 to establish a data communication rate with the AN 120. After successfully receiving and decoding the DRC and pilot, the AN 120 can transmit a Reverse Traffic Channel Acknowledge (RTCAck) message, 350, on the forward traffic channel (F-TCH). Upon receipt of the RTCAck message, the AT 302 can send a Traffic Channel Complete (TCC) message, 360, on the reverse traffic channel (R-TCH). Dedicated channels are then established in both the forward and reverse directions and the AT 302 and the AN 120 can both communicate data bidirectionally. The various messages communicated between access terminal 302 and access network 120 are known in the art and are documented in 3GPP2 C.S0024-A Version 3.0, cdma2000 High Rate Packet Data Air Interface, dated Sep. 12, 2006, which is incorporated herein by reference in its entirety. Accordingly, a detailed explanation of the setup procedures and messages will not be provided herein.

If the DOS message or other application layer message is optionally bundled in the connection request access message, that information does not impact the traffic channel setup, discussed in the foregoing. Generally, the application specific data can be detected and merely passed on to the appropriate destination by AN 120. However, the application specific information may further reduce latency in delay sensitive applications by providing data needed (e.g., a PTT call request) for further processing by remote applications (e.g., a PTT server) to establish the data communication (e.g., a PTT call) once the traffic channels are setup between AT 302 and AN 120. Accordingly, the data included in the application layer message does not have to wait for the establishment of the traffic channels between the AT 302 and AN 120 before being forwarded to the network.

As will be appreciated by those skilled in the art the QoS resources needed may vary for different applications or within applications. The following examples describe QoS design under different QoS resource scenarios:

When traffic channel resources and QoS resources (e.g., In-Call Signaling and Media reservations) are available in the sector of the originator AT 302 sector, the RAN signals that QoS resources are available for both the forward and reverse links by transmitting FwdReservationOn and RevReservationOn messages for the In-Call Signaling and Media reservations. This case is illustrated in FIG. 3A and described in the foregoing description.

Figure 3B:
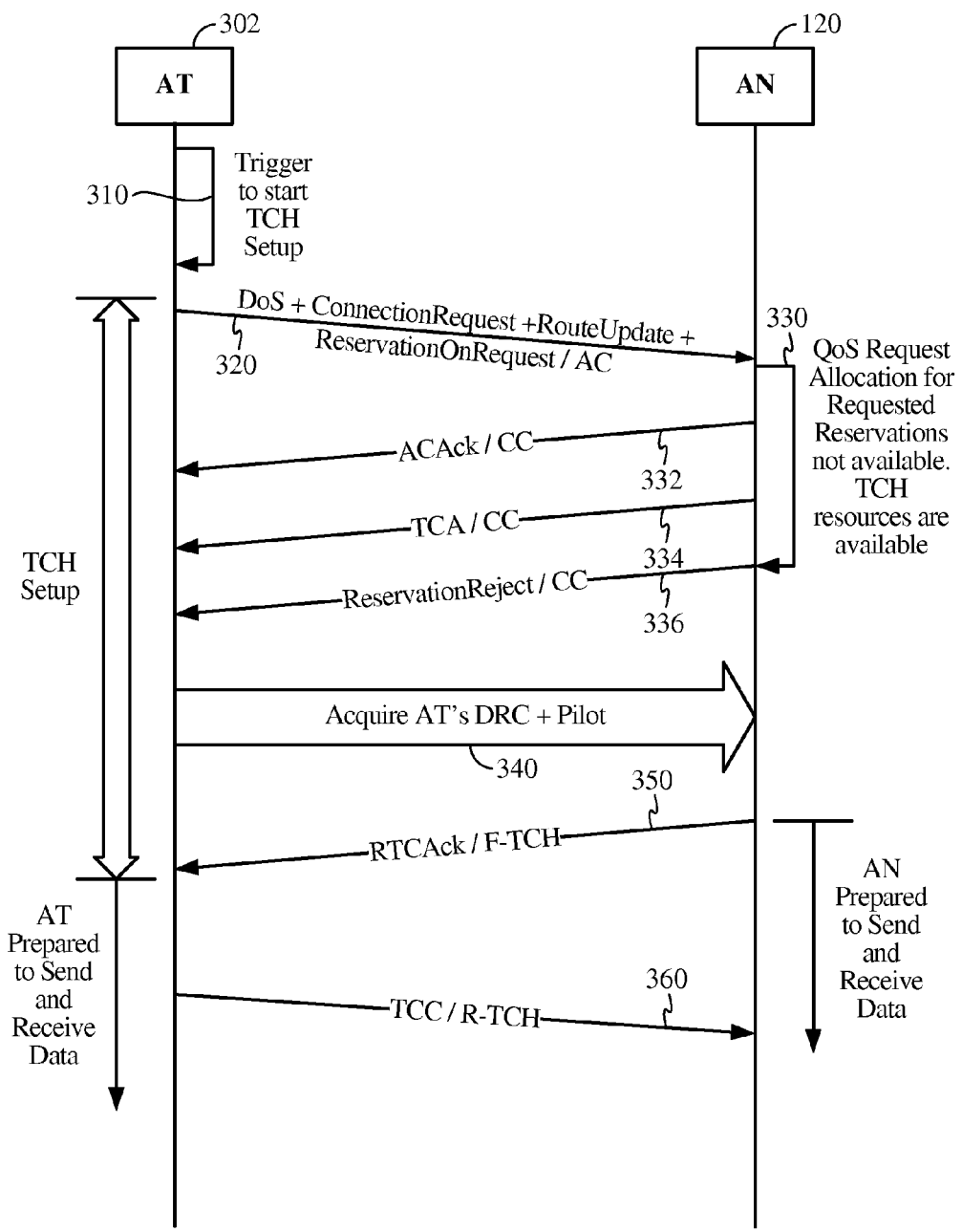

When traffic channel resources are available in the sector where the originator AT 302 is located, but QoS resources for some or all of the reservations are not available, the AN 120 can still allocate the traffic channel and transmits the TCA message to the originator AT 302. However, the AN 120 rejects the QoS request for the reservations it cannot provision by transmitting a ReservationReject message to AT 302. The availability of the traffic channel enables the AT 302 to attempt to complete its call setup signaling handshake over the traffic channel when the QoS resources (e.g., In-Call Signaling and Media reservations) are not available. This case is illustrated in FIG. 3B.

Figure 3C:
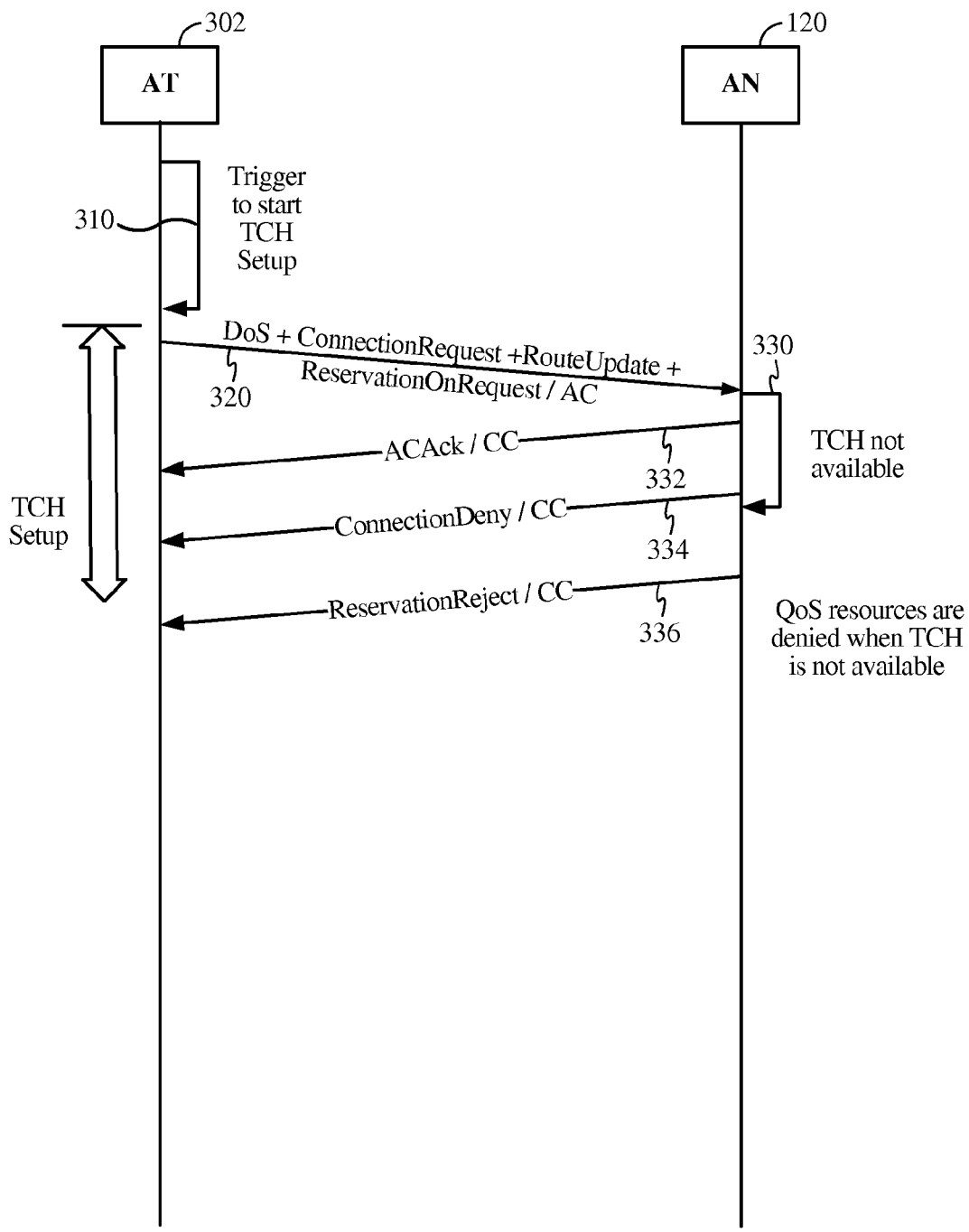

When no traffic channel resources are available in the originator AT's sector, the AN denies the traffic channel request by transmitting the ConnectionDeny message (e.g., per the 1xEV-DO Revision A standard). In this case the QoS request for the reservations also is denied by transmitting a ReservationReject message to AT 302. This case is illustrated in FIG. 3C.

If some of the In-Call Signaling and Media reservations are already allocated to the originator AT at the time of arrival of a call setup packet, the AN/RAN may only activate the In-Call Signaling and Media reservations that are not currently allocated.

As noted above, embodiments of the invention can reduce process delays in delay sensitive applications. A group communication/Push-to-Talk (PTT) system is an example of a delay sensitive system that can take advantage of reduced connection times offered by the communication signal bundling disclosed herein. For example, embodiments of the invention provide for an AT to send a request to turn on the reservations for needed QoS resources (e.g., In-Call Signaling and Media reservations for a PTT call) by transmitting a ReservationOnRequest message in the same access capsule as its connection request (e.g., ConnectionRequest+RouteUpdate) message. Optionally, a DataOverSignaling (DOS) message can be bundled in the same access capsule. If the In-Call Signaling forward and reverse QoS reservations are allocated at the time of the PTT call, the AT can request the Media QoS reservations to be turned on. These requests can be made as part of the ReservationOnRequest message.

The group communication system may also be known as a push-to-talk (PTT) system, a net broadcast service (NBS), a dispatch system, or a point-to-multi-point communication system. Typically, a group of access terminal users can communicate with one another using an access terminal assigned to each group member. The term "group member" denotes a group of access terminal users authorized to communicate with each other. Although, group communication systems/PTT systems may be considered to be among several members, the system is not limited to this configuration and can apply to communication between individual devices on a one to one basis.

The group may operate over an existing communication system, without requiring substantial changes to the existing infrastructure. Thus, a controller and users may operate in any system capable of transmitting and receiving packet information using Internet protocol (IP), such as a Code Division Multiple Access (CDMA) system, a Time Division Multiple Access (TDMA) system, a Global System for Mobile Communications (GSM) system, satellite communication systems, combinations of land line and wireless systems, and the like.

Group members may communicate with each other using an assigned access terminal, such as access terminals (ATs) 102, 108, and 302. The ATs may be wireline or wireless devices such as terrestrial wireless telephones, wireline telephones having push-to-talk capability, satellite telephones equipped with push-to-talk functionality, laptop or desktop computers, paging devices, or any combination thereof. Furthermore, each AT may be able to send and receive information in either a secure mode, or a non-secure (clear) mode. It should be understood that reference to an AT is not intended to be limited to the illustrated or enumerated examples, and may encompass other devices that have the capability to transmit and receive packet information in accordance with the Internet Protocol (IP).

When a group member wishes to transmit information to other members of the group, the member may request the transmission privilege by pressing a push-to-talk button or key (e.g., 228 in FIG. 2) on an AT, which generates a request formatted for transmission over a distributed network. For example, the request may be transmitted over the air to one from AT 102 or more MPTs (or base stations) 124. A BSC/PCF122, which may include a well-known inter-working function (IWF), packet data serving node (PDSN), or packet control function (PCF), for processing data packets may exist between MPT/BS 124 and the distributed network. However, the requests may also be transmitted through the public switched telephone network (PSTN) to a carrier network 126. The carrier network 126 may receive the request and provide it to the RAN 120.

Figure 4:
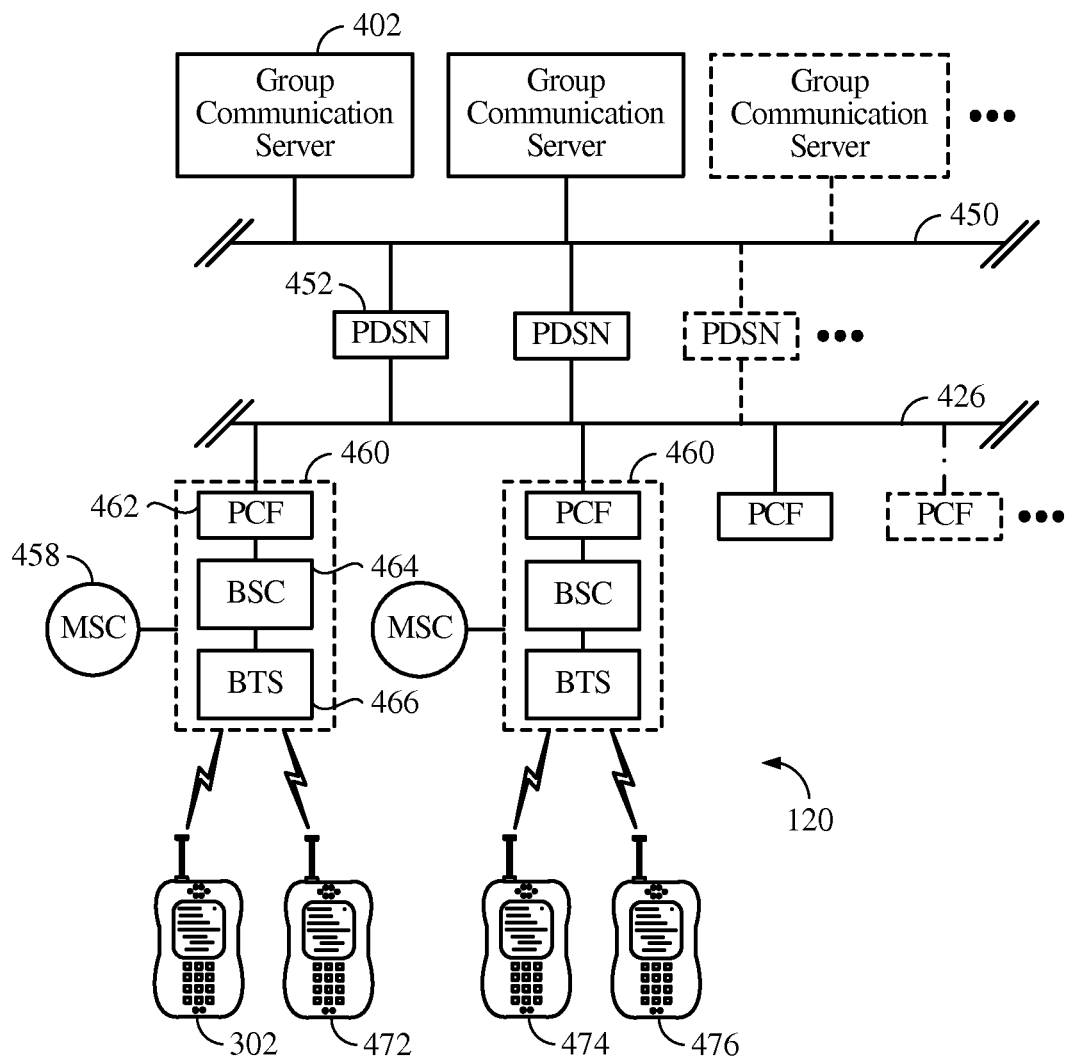
FIG. 4 is an illustration of a group communication system in accordance with at least one embodiment of the invention.

Referring to FIG. 4, one or more group communication servers 402 can monitor traffic of the group communication system through its connection to distributed network. Since the group communication server 402 can be connected to the distributed network through a variety of wired and wireless interfaces, geographic proximity to group participants is not necessary. Typically, a group communication server 402 controls communications between the wireless devices of set group members (ATs 302, 472, 474, 476) in a PTT system. The wireless network illustrated is merely exemplary and can include any system whereby remote modules communicate over-the-air between and among each other and/or between and among components of a wireless network including, without limitation, wireless network carriers and/or servers. Further, a series of group communication servers 402 can be connected to a group communication server LAN 450.

The group communication server(s) 402 can be connected to a wireless service provider's packet data service node (PDSN) such as PDSN 452, shown here resident on a carrier network 426. Each PDSN 452 can interface with a base station controller 464 of a base station 460 through a packet control function (PCF) 462. The PCF 462 may be located in the base station 460. The carrier network 426 controls messages (generally in the form of data packets) sent to a MSC 458. The MSC 458 can be connected to one or more base stations 460. In a similar manner to the carrier network, the MSC 458 is typically connected to the BTS 466 by both the network and/or Internet for data transfer and PSTN for voice information. The BTS 466 ultimately broadcasts and receives messages wirelessly to and from the wireless ATs, such as cellular telephones 302, 472, 474, 476, as is well known in the art. Accordingly, the general details of a group communication system will not be further discussed. Further, although the description herein discusses specific aspects of specific systems (e.g., PTT, QChat®, 1xEV-DO) to provide additional details and examples, embodiments of the invention are not limited to these specific illustrations.

As discussed above, the AT 302 requests a traffic channel in order to establish a communication (e.g., a PTT call). The PTT call can be originated by the originator AT 302 if both, traffic channel and QoS resources for In-Call Signaling and Media are available (additional details regarding the QoS resources are provided below and in FIG. 5). In the conventional systems, the AT 302 would have to establish the traffic channel connection with the AN 120 and then request the QoS resources. However, to reduce this delay in accordance with embodiments of the invention, the signaling messages needed to establish the PTT call are bundled in the initial access channel message along with the original connection request.

1xEV-DO Revision A is designed to provide efficient access to packet data networks and is widely based on the Internet for its network architecture. Data traffic traversing Internet Protocol (IP) network elements at the PDSN 452, PCF 462, and RAN 120 can be based on standard Internet Engineering Task Force (IETF)-based protocols that support methods for differentiating traffic based on QoS requirements. QoS between the AT 302 and the 1xEV-DO Revision A network is configured as described in the 3GPP2 X.S0011-004-C Version 2.0 cdma2000 Wireless IP Network Standard: Quality of Service and Header Reduction specification, the contents of which are incorporated herein by reference. Data traffic transmitted over the air interface between the AT 302 and the RAN 120 can be configured for appropriate QoS treatment via 1xEV-DO Revision A protocols as described in the 3GPP2 C.S0024-A Version 3.0 document referenced above. 1xEV-DO Revision A provides standard mechanisms to offer intra-AT and inter-AT QoS. Intra-AT QoS provides differentiation of data streams belonging to the same user, while inter-AT QoS provides differentiation of packets belonging to different users.

To achieve QoS, traffic differentiation should be available end-to-end. All network components including the AT 302, RAN 120 (BTS 466, BSC 464), PDSN 452, and Internet routers should implement/support QoS. End-to-end QoS in 1xEV-DO Revision A networks can be achieved through the following mechanisms:

Packet Fitters: Packet filters identify a flow at the PDSN. Packet filters are used to map forward data traffic to channels established during QoS negotiation (for example, at the time of powering up QChat). Packet filters are set at that PDSN as described in the 3GPP2 X.S0011-004-C Version 2.0 cdma2000 Wireless IP Network Standard: Quality of Service and Header Reduction specification.

QoS Profiles (Profile IDs): QoS Profiles and/or Profile IDs are a mechanism to specify (or predefine) relevant air interface parameters for a data service. It is a 'shorthand' identifier that the AT uses when negotiating a QoS reservation for a flow with the RAN. Standard Profile ID assignments available for various data services are described in TSB58-G Administration of Parameter Value Assignments for cdma2000 Spread Spectrum Standards, the contents of which are incorporated herein by reference.

Reverse Traffic Marking: The AT can mark reverse traffic data in accordance with the Differentiated Services (DiffServ) framework and standards. These markings define the QoS network treatment requested for data outbound at the PDSN.

QoS in a 1xEV-DO Revision A network is also based on the proper mapping or binding of the following elements for the AT's PPP session, such as follows:

IP (Application) Flow: Application layer QoS requirements for the air interface is identified per unique IP flow. A reservation label is associated with the IP flow to identify the QoS requirements for the flow between the AT and the RAN. An IP flow is then mapped onto an RLP flow that best satisfies the QoS requirements.

RLP (Link) Flow: Radio Link Protocol (RLP) flows are allocated based on QoS requirements (e.g., RLP parameter configuration) for upper layer flows. IP flows with the same QoS requirements can be mapped onto the same RLP flow. In the reverse direction, an RLP flow is mapped onto a (Reverse Traffic Channel Media Access Control) RTCMAC flow.

RTCMAC flow: RTCMAC flows are allocated based on QoS requirements that define physical layer latency and/or capacity needs for an upper layer flow. For example, flows can be low-latency or high capacity flows. RLP flows with the same QoS requirements can be mapped to the same RTCMAC flow.

Figure 5:
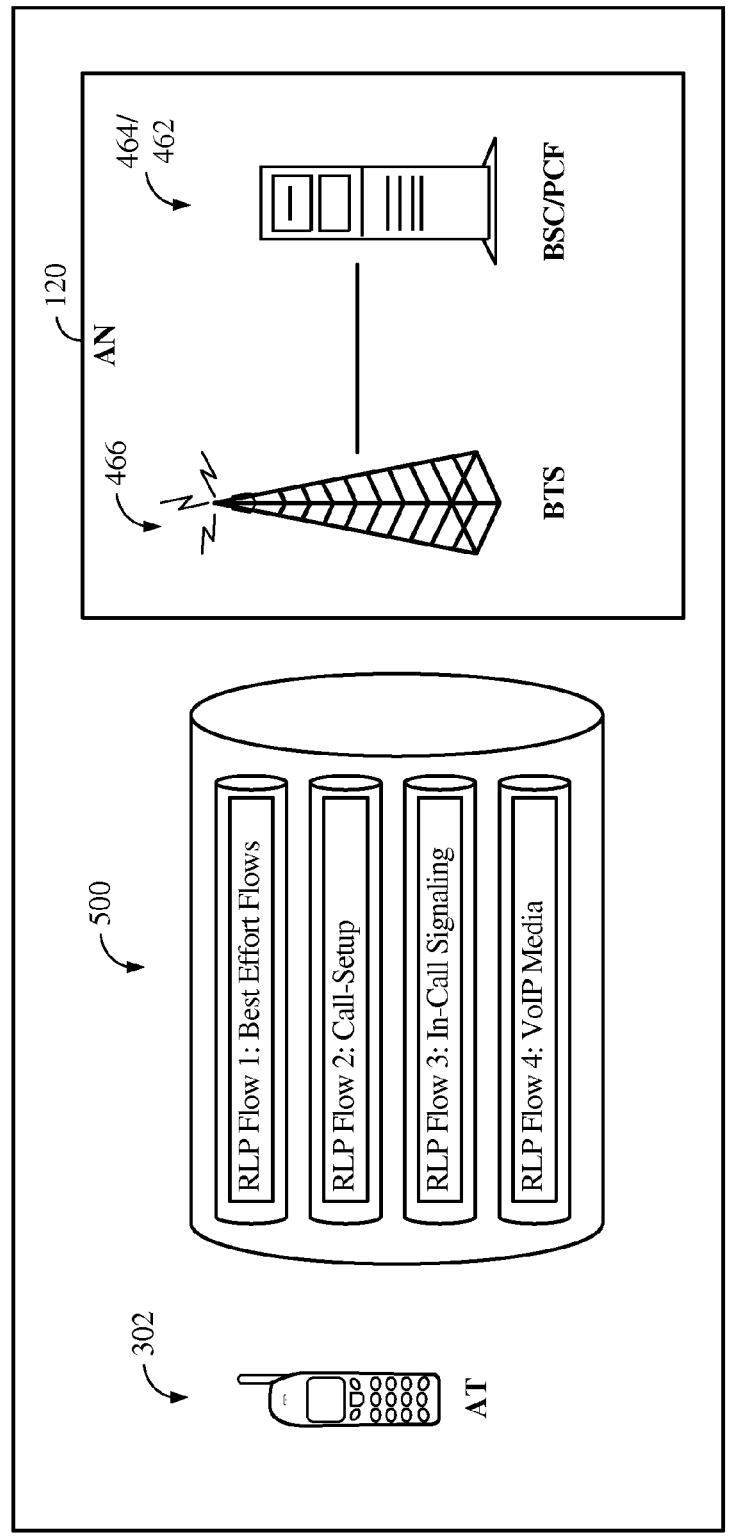
FIG. 5 is an illustration of Radio Link Protocol (RLP) flows in accordance with at least one embodiment of the invention.

FIG. 5 illustrates the multiple RLP flows 500 for a PTT-enabled AT 302 in communication with access network 120. The QoS requirements for each flow can be specified via QoS profiles. As noted above different applications can have different QoS requirements. For example, PTT over 1xEV-DO Revision A receives high priority and low latency data delivery through the specification of network QoS requirements. An exemplary PTT system can use the allocation of three IP flows at the AT, a flow for Call-Setup Signaling; a flow for In-Call Signaling; and a flow for Media. Each IP flow has specific QoS requirements and is mapped onto three separate RLP flows. The AT can further use a default Best Effort (BE) flow. QoS requirements for Media can be considered to be similar to VoIP media and therefore this RLP flow can be shared with VoIP.

Although the foregoing description provides many details specific to a PTT/QChat® system and the 1x EV-DO network to provide a detailed illustration of various aspects of embodiments of the invention, those skilled in the art will appreciate that embodiments of the invention are not limited to any specific application and/or network. Embodiments of the invention can include any application that has QoS requirements. Further, any network that can support the allocation of QoS resources bundled with the initial connection setup request can also be included in embodiments of the invention.

Figure 6:
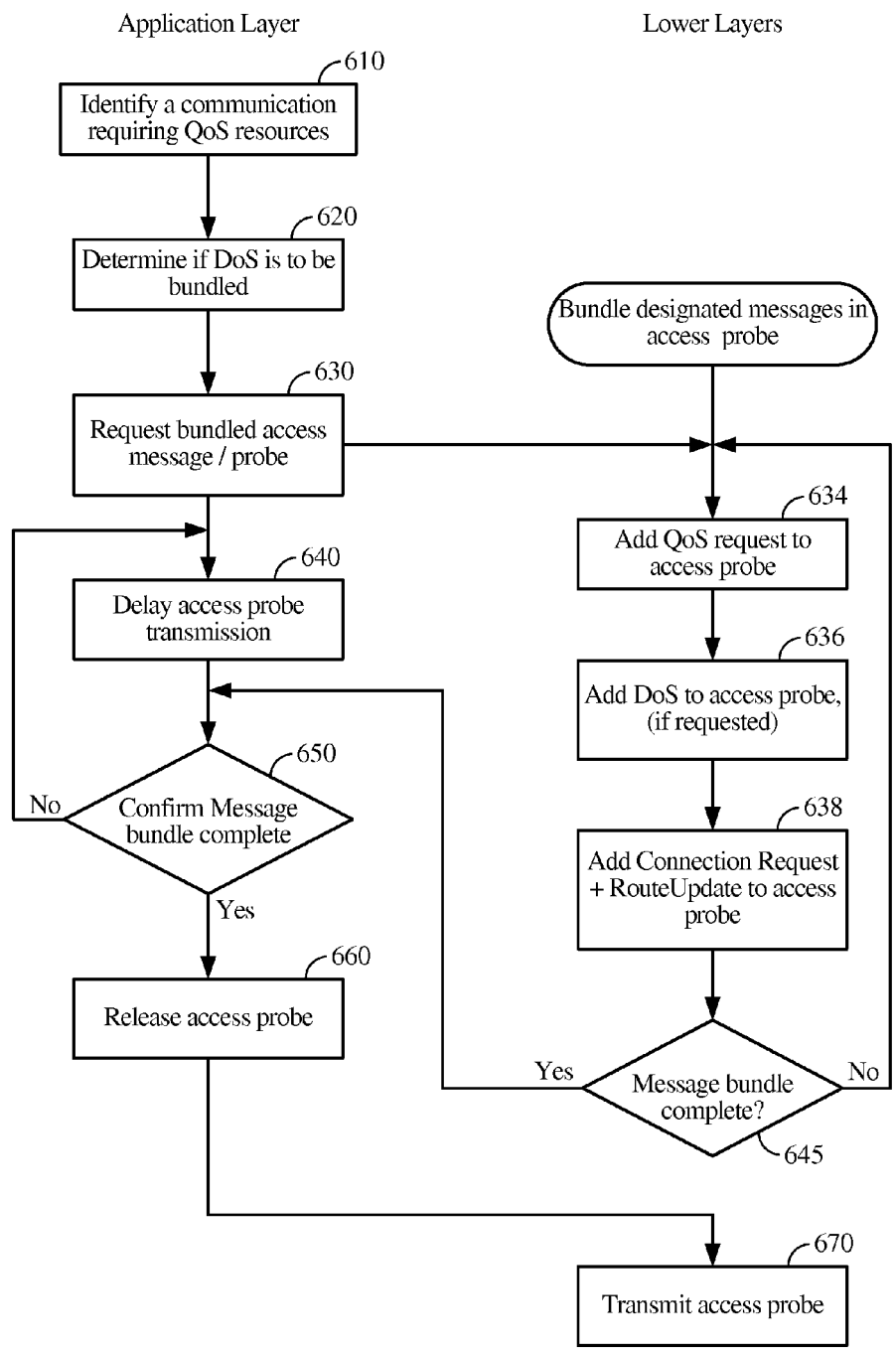
FIG. 6 is a flowchart in accordance with at least one embodiment of the invention.

Referring to FIG. 6, a flowchart illustrating the bundling process according to embodiments of the invention is provided. For example, the method can include an application identifying a communication to be requested requires QoS resources (e.g., a PTT call), in block 610. Additional messages can be considered for bundling (e.g., DOS message) 620, if the additional message is used and there is room in the access probe. A request for a bundled access message (e.g., access probe) can then be communicated from the application layer, in block 630, to lower layers for bundling of the requested messages in the access probe. As used herein the application layer can include the requesting application (e.g., a PTT client) and a bundling API that facilitates interface between the application layer and the lower layers (e.g., RLC, MAC, and Physical Layers). However, it will be appreciated that embodiments of the invention are not limited to this configuration. For example, the application itself could contain the functionality of the bundling API.

In block 634, after the receipt of the bundled request, the QoS request can be added to the access probe. Likewise, in block 636, the DOS message can be added to the access probe if requested and there is sufficient space in the access probe. Additionally, in block 638, the connection request and route update messages are added to the access probe. A check can be performed to determine whether the bundled message is complete, in block 645. If not, the process can loop back to check for the missing messages, as they may be delayed. A delay element (e.g., timer) can also be set at the application layer, in block 640, to allow for the bundling of the access probe. The process can loop via block 650 until the application layer receives an indication from the lower layers that the message bundling is complete 645 (or until the event is timed out and the access probe is sent). After receiving the confirmation, the access probe delay can be released, 660, and the access probe can be transmitted 670.

As discussed in the foregoing, the trigger (e.g., 310) can be any event that causes an application to initiate a connection request with QoS requirements, which are known to the application. The trigger may be activated manually via hard key or soft key activation, may be activated in response to a received signal (e.g., voice command, signal from the network, etc.) or may be activated in response to condition detected by the application.

Figure 7:
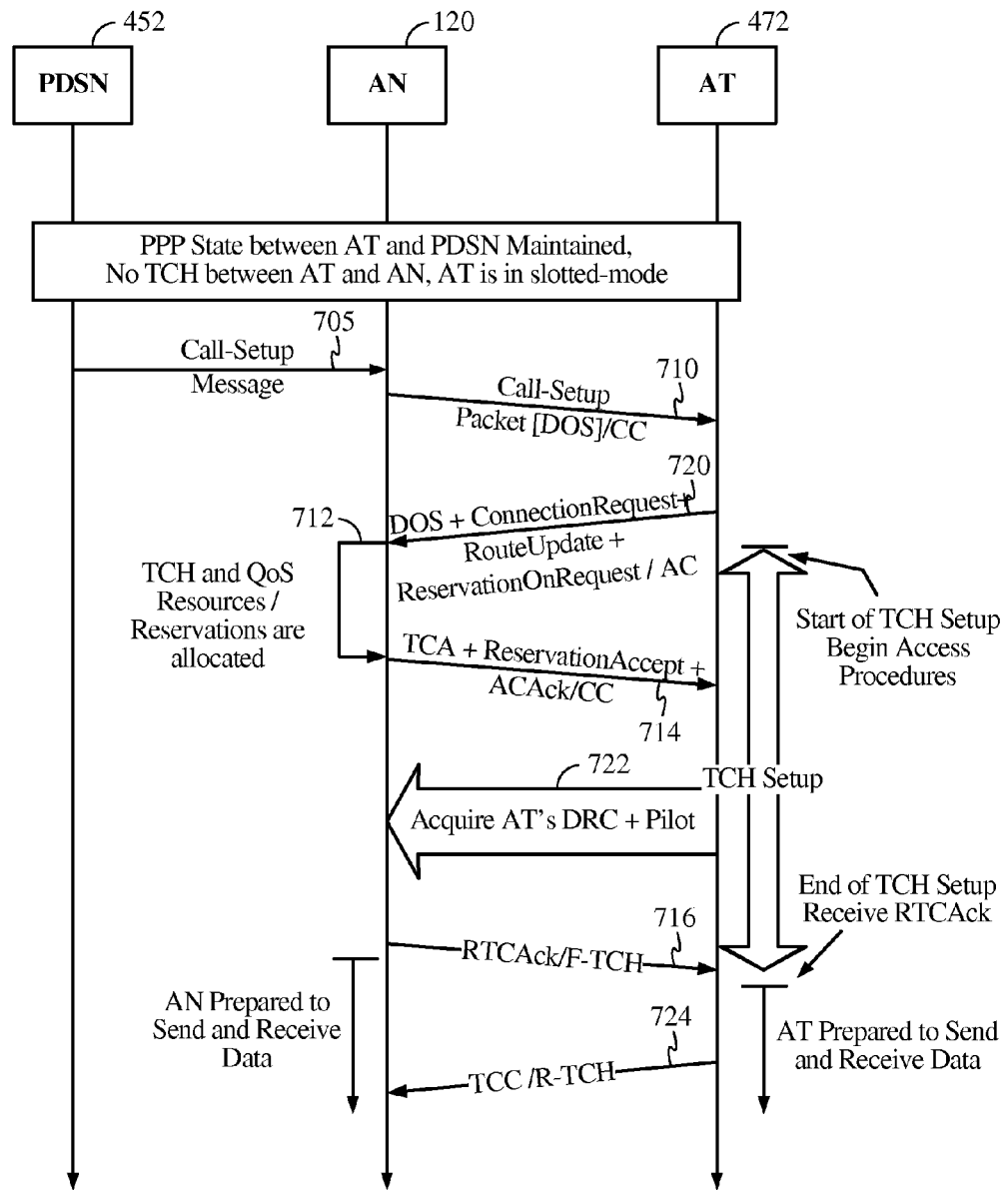
FIG. 7 is a signal flow diagram related to a target access terminal in accordance with at least one embodiment of the invention.

For example, as illustrated in FIG. 7, an access terminal (AT) 472, may receive a trigger, such as an announce message or call setup message, 705, in a PTT system. Specifically, a call setup message, 705, can be transmitted via PDSN 452 and AN 120. Access network 120 can forward the call setup message over a control channel, 710, to the target AT 472. Upon receipt and decoding of the call setup packet, AT 472 can determine that the requested communication (e.g., a PTT call) uses QoS resources. Accordingly, the call setup message received from the network can serve as a trigger to initiate the bundling of the subsequent response. While FIG. 7 illustrates the call-setup packet being sent via a DoS packet to AT 472, it will be appreciated that a standard-page followed by traffic-channel (TCH) set-up could be implemented in alternative embodiments of the invention. In this alternative embodiment, it will be appreciated that the call set-up packet is not sent to AT 472 until the TCH is brought up.

For example, AT 472 can respond with a bundled request, 720, including a connection request (e.g., ConnectionRequest, +RouteUpdate), a QoS reservation (e.g., ReservationOnRequest) and optionally an application layer message (e.g., DOS) on an access channel. Including the DOS allows for application data to be sent to a destination prior to establishing a traffic channel. Requesting the QoS resources allows for the allocation of the need QoS resources prior to establishing the traffic channel. Accordingly, the responsiveness of the communication system may be improved. Upon receipt of the connection request a traffic channel and requested resources can be allocated, 712, at access network (AN) 120. The traffic channel assignment (TCA), QoS resources acceptance, and acknowledgement of the access channel message can be transmitted, 714, to AT 472. The traffic channel setup can continue in 722, 716 and 724, until both the AN 120 and AT 472 are prepared to send and receive data as discussed in the foregoing and known in the art. Accordingly, a detailed explanation will not be provided.

In view of the foregoing disclosure, those skilled in the art will recognize that embodiments of the invention include methods of performing the sequence of actions, operations and/or functions previously discussed. For example, a method for transmitting communication signals in a wireless network can include bundling a connection request and a reservation for QoS resources into an access message at an access terminal, and transmitting the access message to an access network. The bundled message can further include an application layer message (e.g., DOS message) that is bundled with the connection request and the reservation into the access message.

Further, as will be appreciated by one of ordinary skill in the art, a given access terminal is typically required to identify itself to an access network before the access network will provision resources (e.g., a traffic channel (TCH), QoS, etc.) to the given access terminal. For example, in EV-DO 1x, the given access terminal may identify itself to the access terminal with a Unicast Access Terminal Identifier (UATI). Accordingly, the given access terminal will convey its UATI via reverse link messaging so that the access network is aware of the sender's identity, for example, by modulating the reverse-link messaging on the reverse link using its UATI. Likewise, UATIs can be used in downlink messaging to identify an intended recipient or access terminal.

UATIs function to uniquely identify an AT only within a particular serving area (e.g., a particular serving sector or cell). Thus, if the AT moves outside of the serving area (e.g., the AT hands off to another cell, another subnet, etc.), a new UATI is assigned to the AT. If the AT attempts to request resources (e.g., QoS resources, a TCH, etc.) from the access network in a new serving area with a UATI allocated to the AT from the old serving area, the access network will not grant the requested resources because the AT does not yet have a proper UATI for the new serving sector.

A condition may arise where an AT enters a new serving area and does not yet have an UATI for identifying itself in the new serving area (e.g., in a boundary region between cells or sectors), and the AT thereby incorrectly identifies itself with the old UATI to the new serving area in a reverse link resource request. This situation may result in call failure, as will be described below with respect to FIGS. 8A and 8B.

Figure 8A:
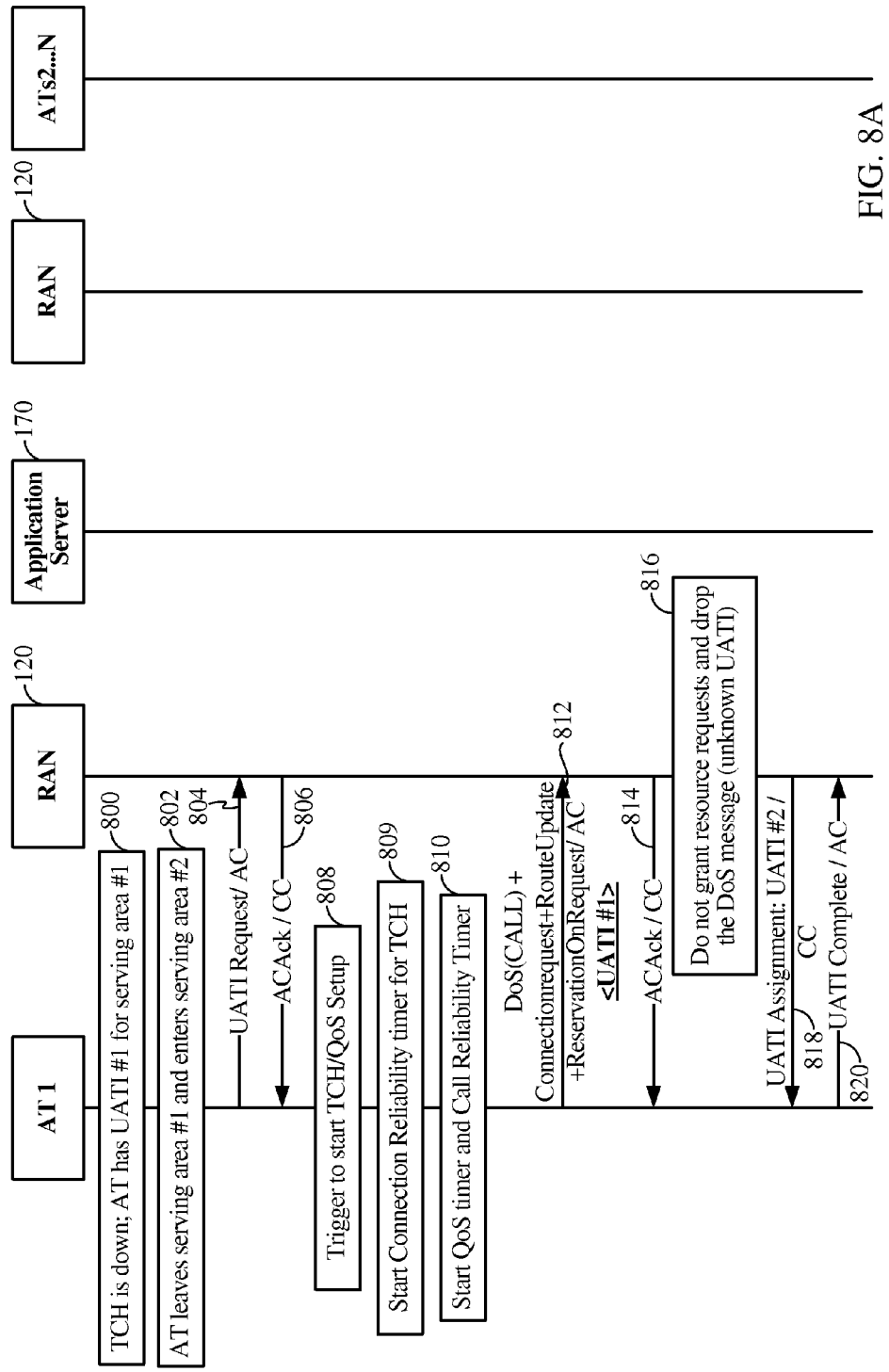
Figure 8B:
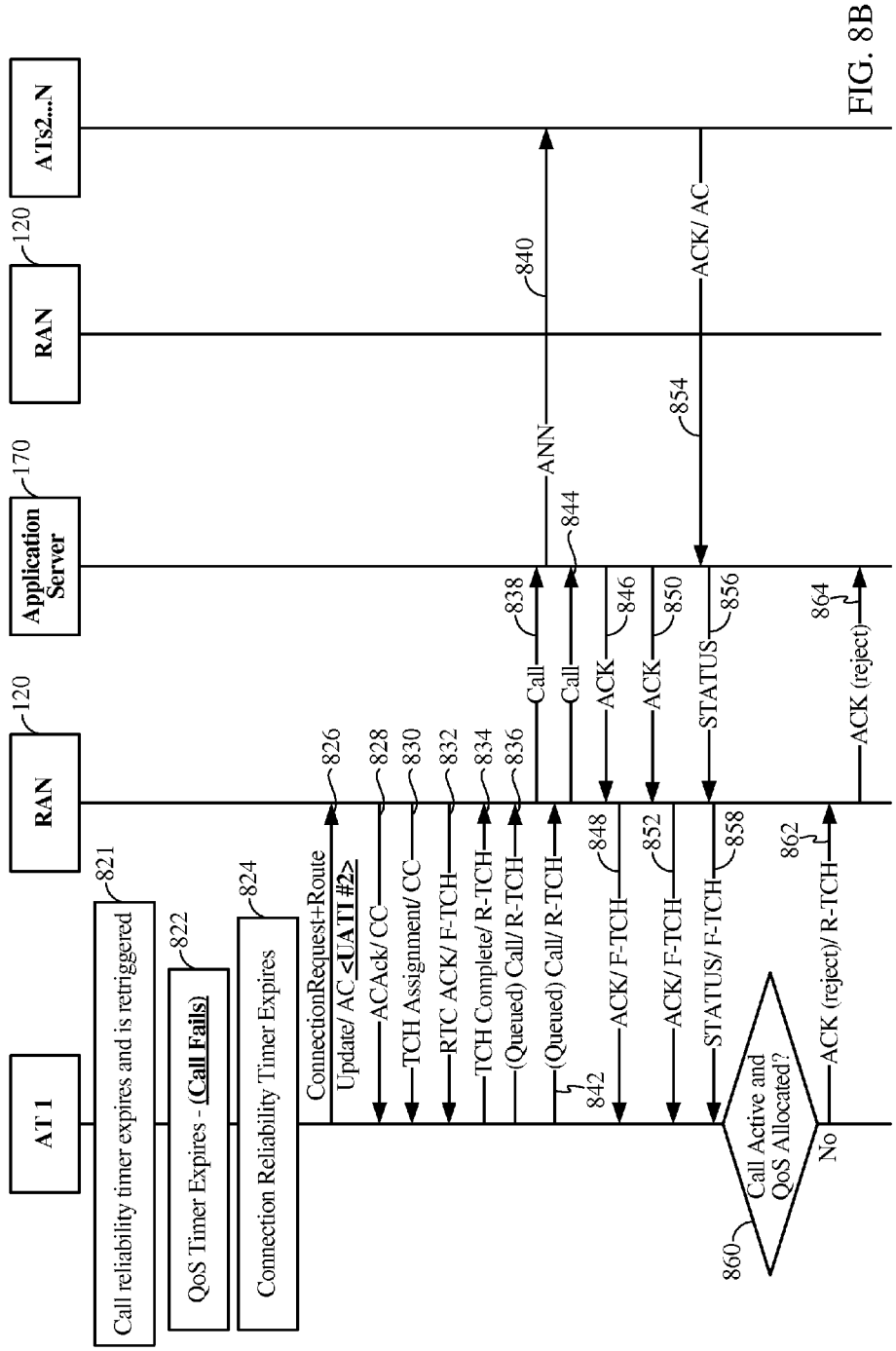

FIGS. 8A and 8B illustrate a communication setup process according to an embodiment. Referring to FIGS. 8A and 8B, in 800, assume that AT 1 is within a first serving area (e.g., sector, cell, etc.) and has been assigned a first UATI for identifying itself within the first serving area. Further assume in 800 that AT 1 does not have an active TCH. Next, AT 1 moves from the first service area to a second service area, 802. It may be assumed within FIGS. 8A and 8B that the second service area does not use the same UATIs as the first serving area.

Thus, upon entry into the second serving area (e.g., after a handoff), AT 1 sends a UATI request on a reverse link access channel to the RAN 120 to request a second UATI within the second serving area, 804. After the RAN 120 receives the UATI request, the RAN 120 acknowledges receipt of the UATI request from AT 1 by sending an ACAck message to AT 1 on the downlink control channel (CC), 806. However, while the RAN 120 acknowledges the UATI request in 806, the RAN 120 has not yet assigned the second UATI to AT 1.

Next, after AT 1 sends the UATI request but before the second UATI is actually assigned to AT 1 for use within the second serving area, a user of AT 1 requests an initiation of a group communication session that requires both TCH and QoS resources, 808. For example, the triggering operation for the group communication session in 808 may correspond to the user of AT 1 pressing a PTT button on AT 1 to initiation a PTT communication session.

After the group communication session request is received at AT 1, AT 1 starts a timer ("Connection Reliability timer") corresponding to a length of time that AT 1 is willing to wait to obtain TCH-resources before re-sending a request for TCH, 809. For example, the Connection Reliability timer can be started by a lower-layer communication-protocol application, such as Advanced Mobile Subscriber Software (AMSS), which is discussed below in more detail. Also, the communication protocol application (e.g., the AMSS) at AT 1 starts a QoS timer that is associated with an expiration period corresponding to the time that the application is willing to wait to receive an allocation of QoS resources, 810. Also in 810, an application (e.g., QChat) that is responsible for managing the group communication session ("group communication session management application") generates a call message for transmission by the communication-protocol application. Upon submitting the call message for transmission by the communication protocol application, the group communication session management application starts a call reliability timer (separate from the Connection Reliability and QoS timers). Each time the call reliability timer expires, a call message is created by the group communication session management application (e.g., QChat) and submitted for transmission by the communication-protocol application. In an example, the group communication session management application (e.g., QChat) can instruct the communication-protocol application (e.g., the AMSS) to schedule the first call message for quick-transmission over a reverse-link signaling channel (e.g., as a DoS message over an access channel), and to schedule the remaining call messages for transmission on the R-TCH after the TCH is obtained.

For example, the communication-protocol application that queues the plurality of call messages may correspond to AMSS, developed by QUALCOMM®. In an example, the AMSS drives the underlying MSM chipset and implements the software protocol stack for the entire suite of CDMA communication technologies that include CDMA2000 1X and CDMA2000 1xEV-DO. There is a mobile operating system layer, which in this embodiment is BREW®, also developed by QUALCOMM. The mobile operating system layer application programming interfaces for chip- or device-specific operations, while providing an isolation layer that eliminates direct contact to the AMSS and any OEM software on the computer platform. The mobile operating system layer enables application development that uses mobile device features without having to rewrite the application each time a new release of the device-specific software is released. The group communication session management application may correspond to a QChat client application running on AT 1, which may work with the AMSS to establish or setup the session.

In 812, a bundled message (e.g., DOS+ConnectionRequest+RouteUpdate+ReservationOnRequest) is configured and transmitted from AT 1 to the RAN 120 on the reverse link access channel. For example, the bundled message can include the first of the plurality of call messages (which is not added to the TCH-dependent transmission queue by the communication-protocol application) generated by the group communication session management application in 810. In a further example, the bundled message of 812 may correspond to the bundled message described above with respect to 320 of FIGS. 3A through 3C, or 720 of FIG. 7. Further, while not disclosed explicitly in the above-embodiments of the invention, a header portion of the bundled message transmitted in 812 is further configured to include the first UATI so as to identify AT 1 to the RAN 120. The RAN 120 acknowledges receipt of the bundled message and sends an access channel acknowledgment (ACAck) on the downlink control channel to AT 1, 814. However, because the first UATI is not known in the second serving area, or at least is not known to be associated with AT 1, the bundled message and its associated resource requests are not granted by the RAN 120, 816. Accordingly, the DoS message of 812 is dropped by the RAN 120 in 816.

In 818, the RAN 120 transmits a UATI assignment to AT 1 on the downlink control channel that allocates the second UATI to AT 1 for use within the second serving area. As will be appreciated, the UATI assignment of 818 is in response to the UATI request received from AT 1 in 804. After receiving the UATI assignment, AT 1 updates one or more registers storing its current UATI with the second UATI (not shown), and transmits a UATI complete message 820 to the RAN 120 on the reverse link access channel.

Next, because the initial bundled message requesting call resources transmitted in 812 is ignored or dropped in 816 by the RAN 120, the RAN 120 does not actually allocate the requested resources. Accordingly, the QoS resources requested by the ReservationOnRequest message are not allocated to AT 1, and at some point the Call Reliability timer that is started by the group communication session management application (e.g., QChat) in 810 expires (e.g., after every 500 ms until a call ACK message is received, a STATUS message is received, or the total number of call message re-transmissions exceeds a threshold), 821. Because the Call Reliability timer expires in 821, the Call Reliability timer is reset in 821 and another call message is submitted to the communication-protocol application (e.g., the AMSS) for transmission. Since TCH is not up yet, the communication-protocol application (e.g., the AMSS) places the call message in its transmission queue for later transmission when the TCH becomes available. Eventually, the QoS timer also expires, and the communication protocol application (e.g., the AMSS) suspends its QoS request operation and notifies the group communication session management application (e.g., QChat) that QoS is in the suspended state. Since QoS has failed, the group communication session management application (e.g., QChat) suspends its call set-up operations and fails the call, 822 (e.g., because it is assumed that the requested QoS resources are a condition for initiating the group communication session). In other words, even if the RAN 120 allocates the requested QoS resources at some point after 822, the group communication session management application would ignore the QoS resources because the call has already failed. However, other operations related to setup of the communication session continue, because certain operations are already queued by the communication protocol application (e.g., the AMSS). In an alternative embodiment, while not shown in FIGS. 8A and 8B, the determination that the QoS resource request fails in 822 can be based on an explicit message from the RAN 120 indicating that the QoS resource request will not be granted. Accordingly, the determination of failure for the QoS resource request can be based upon timer-expiration or upon an explicit indication of QoS failure.

Eventually, the Connection Reliability timer started in 809 also expires, 824, which triggers the communication-protocol application (e.g., AMSS) to resend its request (e.g., ConnectionRequest message) for the TCH, 824. The QoS resources are not requested again at this point because the Connection Reliability timer is associated with the setup of traffic channel (TCH) resources and not QoS resources. Because the ACAck was received in response to the bundled message in 814, AT 1 knows that the RAN 120 received the bundled message. As such, the communication-protocol application of AT 1 simply waits to receive the QoS resources requested by the ReservationOnRequest without resending the ReservationOnRequest. As such, when AT 1 resends the TCH request, AT 1 only sends the ConnectionRequest and RouteUpdate messages on the reverse link access channel, 826, and does not re-send the ReservationOnRequest message (e.g., because the Connection Reliability timer has expired which is associated with setting up a traffic channel (TCH) resources and not a QoS resource). Also, because AT 1 has updated its UATI to correspond to the second UATI within the second serving area, AT 1 modulates the message in 826 by using the second UATI. The RAN 120 receives the resource request message in 826 and acknowledges the message with an ACAck on the downlink control channel, 828, transmits a traffic channel assignment (TCA), 830, and transmits a Reverse Traffic Channel Acknowledge (RTCAck) message, 832 on the forward traffic channel (F-TCH) (e.g., after successfully receiving and decoding the DRC and pilot from AT 1, not shown in FIGS. 8A and 8B). Upon receipt of the RTCAck message, AT 1 can send a Traffic Channel Complete (TCC) message, 834, on the reverse traffic channel (R-TCH).

After obtaining the TCH, AT 1 sends each of the call messages queued from 810 one after the other. Thus, AT 1 sends a first queued call message on the R-TCH, 836, and the RAN 120 forwards the first queued call message to the application server 170, 838. The application server 170 forwards announce messages to the RAN 120 for transmission to ATs 2 . . . N, 840. Meanwhile, AT 1 continues to send each of the queued call messages one after the other, and sends another queued call message to the RAN 120 on the R-TCH, 842, and the RAN 120 again forwards the call message to the application server 170, 844. The application server 170 responds to the first and second queued call messages with ACKs, 846 and 850, which are transmitted to AT 1 on the F-TCH, 848 and 852. While only two queued call messages are shown as transmitted in FIGS. 8A and 8B, it will be appreciated that more (or fewer) queued call messages may be transmitted in other embodiments.

In 854, at least one of ATs 2 . . . N receives and acknowledges the announce message and accepts the announced communication session. The RAN 120 receives the ACK on the reverse link access channel from the at least one of ATs 2 . . . N, and forwards the ACK to the application server 170. Upon receiving an ACK from a first responder to the announced group communication session, the application server 170 sends a STATUS message to the RAN 120 for transmission to AT 1, 856, and the RAN 120 transmits the STATUS message to AT 1 on the F-TCH, 858. Upon receiving the STATUS message, AT 1 determines whether the call is still active, 860. In this case, it has already been established in 822 that the call had failed because QoS resources were not allocated in time (i.e., before QoS timer expiration), and as such AT 1 transmits an ACK that rejects the call on the R-TCH, 862, and the RAN 120 forwards the ACK (reject) to the application server 170, 864, which cancels the group communication session.

As will be appreciated by one of ordinary skill in the art, the inclusion of the incorrect UATI for the second serving area in the bundled message of 812 leads both to call failure as well as unnecessary signaling and resource allocation in the process of FIGS. 8A and 8B. A number of alternative embodiments will now be described in more detail with respect to FIGS. 9A through 11B wherein call failure can be reduced and/or avoided even where an incorrect UATI is attached to an initial transmission of the bundled message.

Figure 9A:
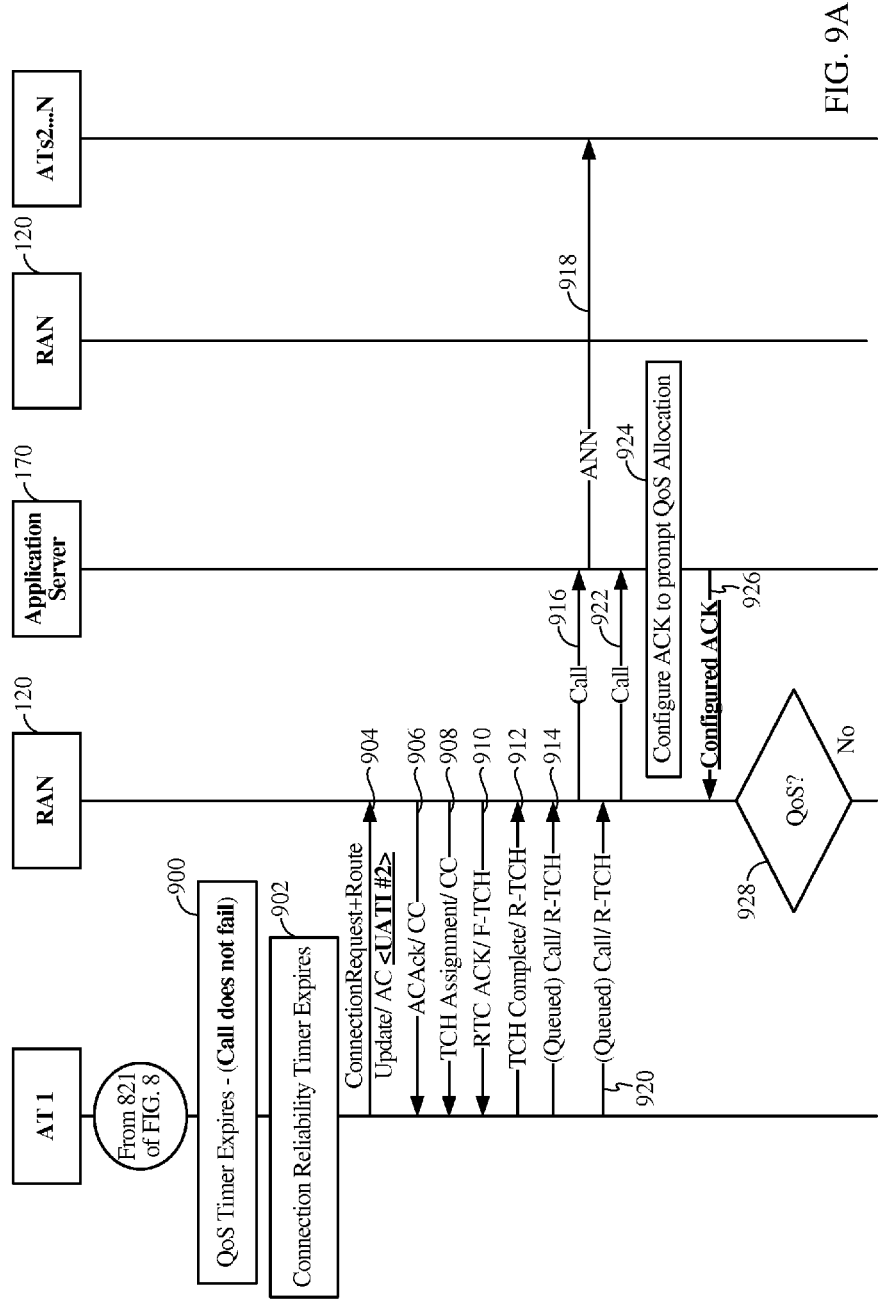
Figure 9B:
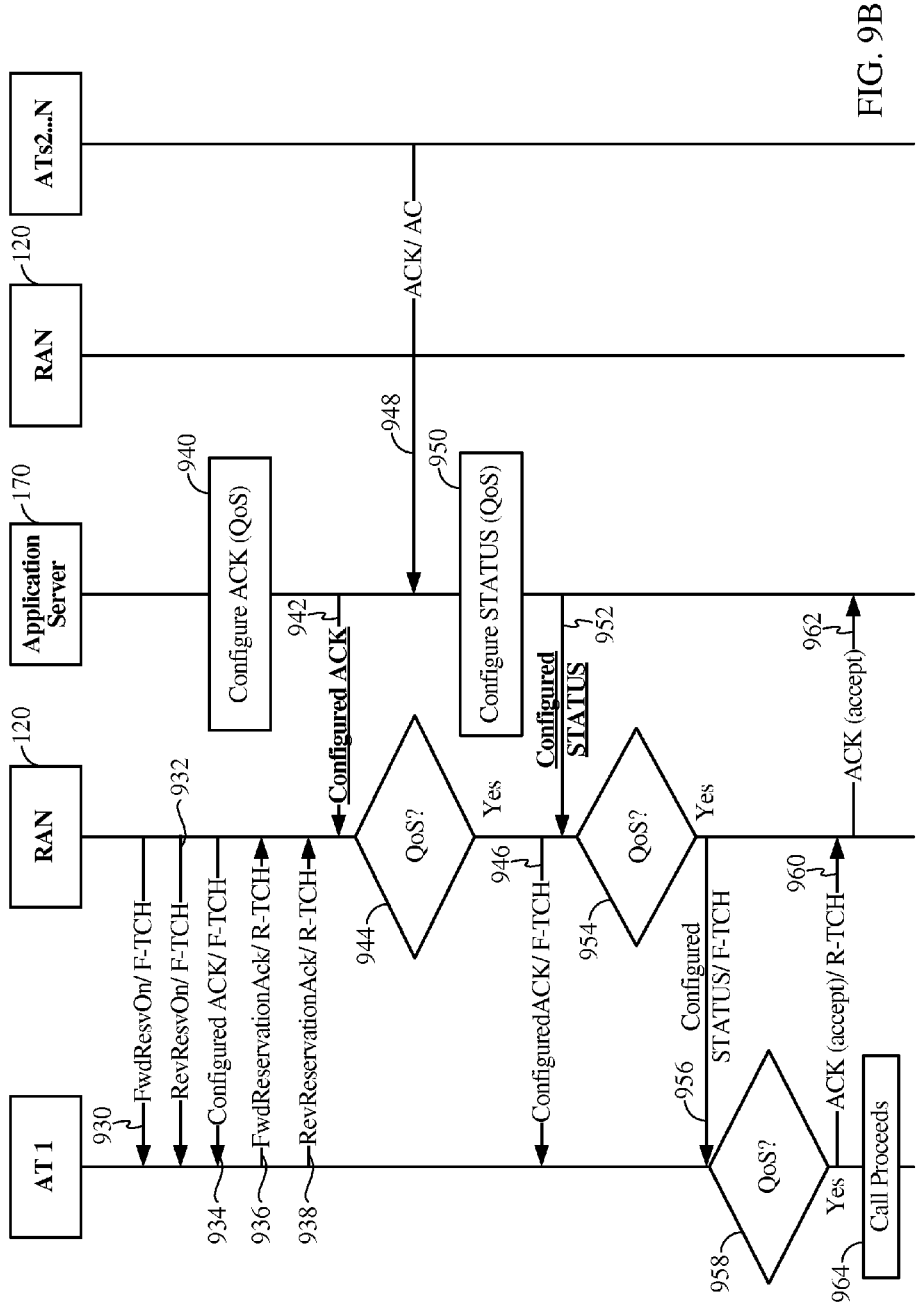

FIGS. 9A and 9B illustrate a communication setup process according to another embodiment of the invention. With respect to FIGS. 9A and 9B, assume that FIGS. 8A and 8B begin at 800 and continues through 821.

In 900, while the group communication session management application receives the SUSPEND notification from the communication protocol application upon expiration of the QoS timer, instead of suspending its call setup operations and failing the call, the group communication session management application refrains from call setup suspension and continues to wait for QoS resources to be allocated to AT 1. In an alternative embodiment, while not shown in FIGS. 9A and 9B, the determination that the QoS resource request fails in 900 can be based upon an explicit message from the RAN 120 indicating that the QoS resource request will not be granted. Accordingly, the determination of failure for the QoS resource request can be based upon timer-expiration or upon an explicit indication of QoS failure.

As in 824, upon expiration of the Connection Reliability timer in 902, because the bundled message did not result in a TCH assignment for AT 1 due to the incorrect UATI, AT 1 continues its attempt to obtain a TCH, and determines to resend its request (e.g., ConnectionRequest message) for the TCH, 902. As in 826, when AT 1 resends the TCH request, AT 1 only sends the ConnectionRequest and RouteUpdate messages on the reverse link access channel, 904, because the Connection Reliability timer is associated with setting up the TCH, but not QoS resources.

After the re-transmission of 904, blocks 906 through 922 of FIGS. 9A and 9B generally correspond to blocks 828 through 844 of FIGS. 8A and 8B, and as such will not be described further for the sake of brevity. In 924, instead of simply responding to the forwarded call message with an ACK as in 846 of FIGS. 8A and 8B, the application server 170 configures an ACK message with a given flag that functions to prompt the RAN 120 to perform a conditional allocation of QoS resources for AT 1. In an example, the given flag may correspond to a given Diffsery Code Point (DSCP) value in a header portion of the ACK message, where the RAN 120 is configured to interpret DSCP fields set to the flagged value as an instruction to perform the conditional allocation of QoS resources to a target of the ACK message (i.e., AT 1, in this case).

Accordingly, assume that the application server 170 inserts a flag into the ACK message in 924 by modifying a DSCP field of the ACK message to have some pre-negotiated value that will be recognized by the RAN 120. However, it will be appreciated that this is merely one manner of flagging the ACK message, and other embodiments need not be limited to using the DSCP field of the ACK message as the flag-portion. After configuring the ACK message in 924, the application server 170 sends the configured ACK to the RAN 120, 926.

Upon receiving the configured ACK message in 926, assume the RAN 120 checks the configured ACK message, extracts the flag and determines to perform the conditional allocation of QoS resources (e.g., because a level of QoS resources associated with the flag have not yet been allocated to AT 1), 928. Accordingly, in 928, the RAN 120 determines whether QoS resources have already been allocated to AT 1 for the group communication session. As discussed above, because AT 1 incorrectly used the first UATI for the first serving area in the second serving area, the ReservationOnRequest message from AT 1 was not granted and the requested QoS resources have not yet been allocated to AT 1 for the group communication session. Accordingly, the RAN 120 determines to allocate QoS resources (e.g., a level of QoS known to be negotiated with AT 1 that is the recipient of the ACK message, such as in-call and media QoS flows) to AT 1 even though a proper ReservationOnRequest message was not received, and the RAN 120 thereby sends FwdReservationOn and RevReservationOn messages on the F-TCH to AT 1 to notify AT 1 of its QoS resource allocation on the forward and reverse links of the TCH, respectively, in 930 and 932. The RAN 120 also forwards the ACK, based on the configured ACK, to AT 1 on the F-TCH, 934. It will be appreciated that in at least one embodiment, the ACK transmitted on the F-TCH in 934 need not differ from the ACK of 848, even though the ACK of 934 is based on a differently configured ACK from the application server 170. AT 1 responds to the FwdReservationOn and RevReservationOn messages with FwdReservationAck and RevReservationAck messages, respectively, over the R-TCH, 936 and 938.

Next, the application server 170 configures another ACK for the second call message, 940. The configuration of 940 may be performed in the same manner as the configuration of 924. Thus, in at least one embodiment, the application server 170 may insert the DSCP flag into each ACK that acknowledges a call message, to ensure that QoS resources for the call are allocated to the originator of the group communication session. The application server 170 sends the configured ACK to the RAN 120, 942, and the RAN 120 again identifies the DSCP flag and checks whether QoS resources have been allocated to AT 1 for the group communication session, 944. Because QoS resources were allocated to AT 1 in response to the first configured ACK from the application server 170, the RAN 120 determines QoS resources are already allocated to AT 1, and the RAN 120 sends the configured ACK to AT 1 on the F-TCH without allocating additional QoS resources, 946.

In response to the announce message of 918, at least one of ATs 2 ... N send an ACK that indicates acceptance of the call to the RAN 120 over the reverse link access channel, and the RAN 120 forwards the ACK (accept) to the application server 170, 948. Upon receiving an ACK (accept) from a first responder to the announced group communication session, the application server 170 configures a STATUS message to include a flag to prompt the conditional allocation of QoS resources at the RAN 120, 950. In an example, the flag in the STATUS message may correspond to the same flag that is used in the ACK messages (e.g., a given value for the DSCP field in a header portion of the message). After configuring the STATUS message in 950, the application server 170 sends the configured STATUS message to the RAN 120 for transmission to AT 1, 952.

The RAN 120 again identifies the DSCP flag and checks whether QoS resources have been allocated to AT 1 for the group communication session, 954. Because QoS resources were allocated to AT 1 in response to the first configured ACK from the application server 170, the RAN 120 determines QoS resources are already allocated to AT 1, and the RAN 120 sends the STATUS message to AT 1 on the F-TCH without allocating additional QoS resources, 956.

At the AT 1, as in 860, upon receiving the STATUS message indicating that the group communication session can begin, AT 1 determines whether QoS resources have been allocated for the group communication session, 958. In this case, because (i) the application server 170 has configured multiple messages with flags to prompt the RAN 120 to perform conditional QoS allocation operations, (ii) the RAN 120 allocates the QoS resources in 930 and 932 and (iii) AT 1 does not preemptively fail the call when the QoS timer times out in 900, AT 1 determines that QoS resources have been allocated for the group communication session in 958. Accordingly, AT 1 transmits an ACK (accept) message to the RAN 120 via the R-TCH, 960, and the RAN 120 forwards the ACK (accept) message to the application server 170, 962. AT 1 can then begin transmitting media associated with the group communication session as an initial floor-holder or call originator, 964.

While not shown explicitly in FIGS. 9A and 9B, in an embodiment of the invention, additional messaging can be exchanged after the STATUS message is received at AT 1 in 956 (i.e., during the call) for setting up QoS while the call is in progress. For example, if QoS allocation (i.e., Fwd/RevReservationAccept messages) are not sent from the RAN 120 until after the STATUS message is sent to AT 1, the call can proceed and QoS can be set-up in-call.

As will be appreciated by one of ordinary skill in the art, while the process of FIGS. 9A and 9B reduces the occurrence of call failure as compared to the process of FIGS. 8A and 8B, the implementation of the process of FIGS. 9A and 9B changes operations at each of AT 1, the RAN 120 and the application server 170. An embodiment will now be described that involves changes at AT 1 and the RAN 120, and not necessarily to the functionality of the application server 170, as compared to the process of FIGS. 8A and 8B.

Figure 10A:
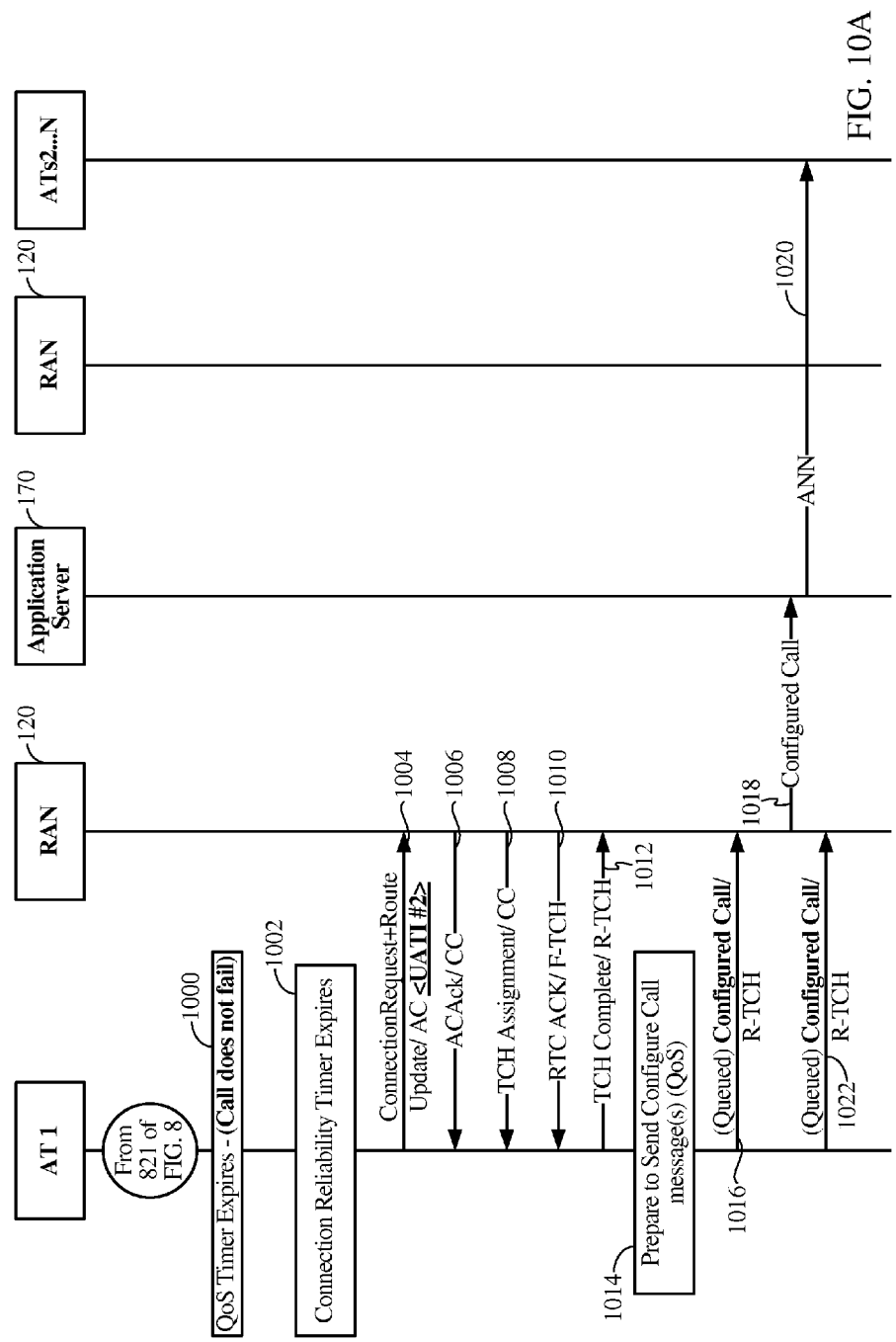
Figure 10B:
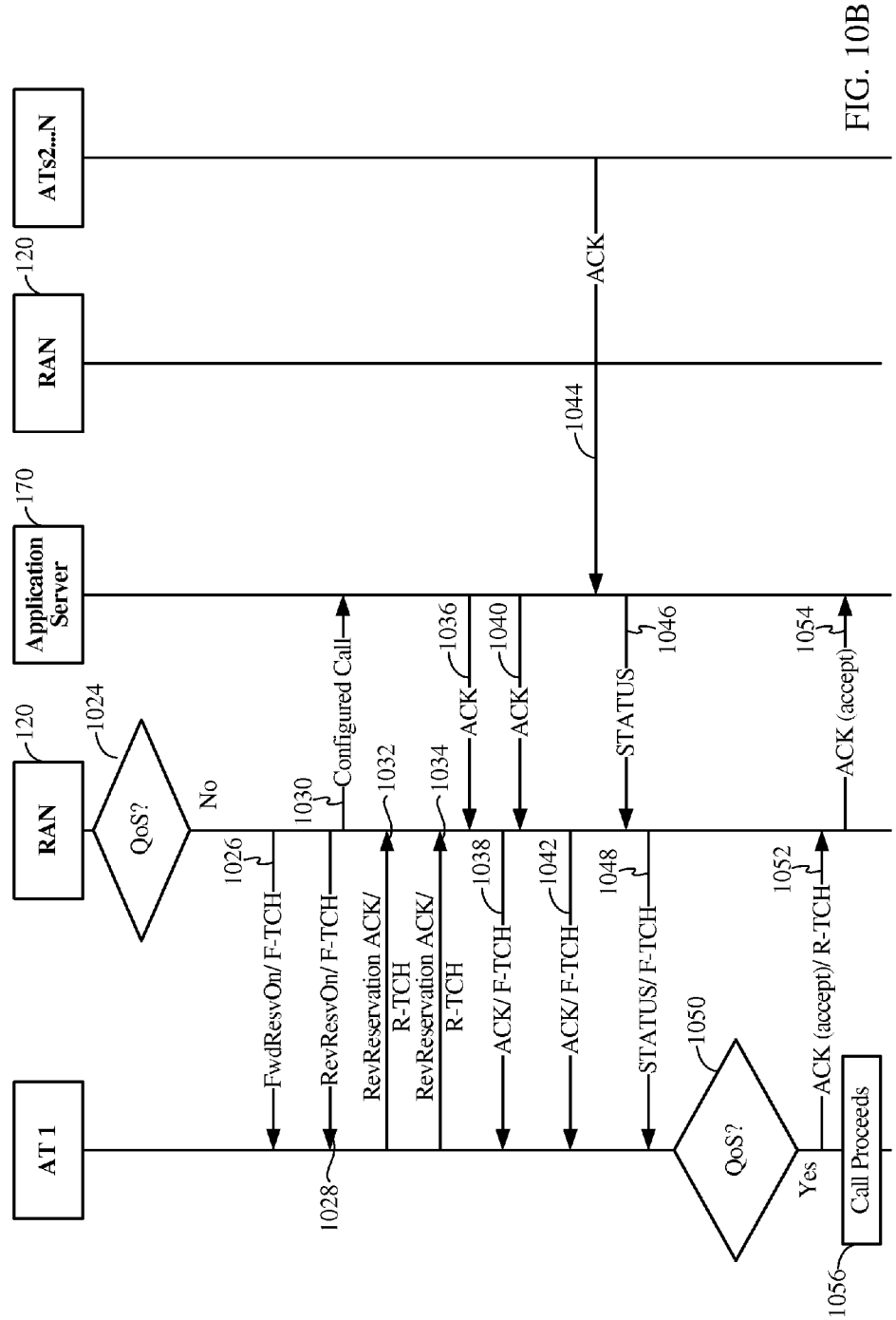

FIGS. 10A and 10B illustrate a communication setup process according to another embodiment of the invention. With respect to FIGS. 10A and 10B, as in FIGS. 9A and 9B, assume that FIGS. 8A and 8B begin at 800 and continue through 821.

Next, assume that blocks 1000 through 1012 of FIGS. 10A and 10B correspond to 900 through 912 of FIGS. 9A and 9B. As such, blocks 1000 through 1012 will not be described further for the sake of brevity. After AT 1 sends the TCH complete message of 1012, AT 1 prepares to send each of the queued call messages that were configured in 821 to include a flag that functions to prompt the RAN 120 to perform a conditional allocation of QoS resources for AT 1, 1014. In an example, the given flag may correspond to a given Diffsery Code Point (DSCP) value in a header portion of the call message, where the RAN 120 is configured to interpret DSCP fields set to the flagged value as an instruction to perform the conditional allocation of QoS resources to a sender of the call message (i.e., AT 1, in this case). In other words, the flag inserted into the configured call message may have the same effect (i.e., triggering of the conditional allocation of QoS resources) as the flag inserted into the ACK and/or STATUS messages in FIGS. 9A and 9B in at least one embodiment, except the DSCP value in FIGS. 9A and 9B instructs the RAN 120 to allocate QoS to the 'target' or destination of the ACK or STATUS message, whereas the DSCP value in FIGS. 10A and 10B instructs the RAN 120 to allocate QoS to the 'sender' or originator of the CALL message. Thus, in an example, different DSCP values can be established for triggering QoS allocation to either a sender or target of a particular flagged message. For example, the group communication session management application (e.g., QChat client) can provide the communication-protocol application (e.g., AMSS) with the DSCP numbers to be 'stamped' or inserted into the call messages, in which case the communication-protocol application can add the DSCP numbers into the respective IP-headers of the call messages in the transmission queue in 1014.

Accordingly, assume that AT 1 inserts a flag into the queued call message of 1014 by modifying a DSCP field of the call message to have some pre-negotiated value that will be recognized by the RAN 120. However, it will be appreciated that this is merely one manner of flagging the queued call message, and other embodiments need not be limited to using the DSCP field of the queued call message as the flag-portion After configuring one or more of the queued call messages to include the DSCP flag, AT 1 transmits a first queued, configured call message to the RAN 120 on the R-TCH, 1016, and the RAN 120 forwards the queued, configured call message to the application server 170, 1018, which generates and sends announce messages ANNs for announcing the group communication session to ATs 2 . . . N, 1020. After sending the first queued, configured call message, AT 1 sends a second of the queued, configured call messages to the RAN 120, 1022. While additional queued, configured call messages may also be transmitted one after the other, for the sake of simplicity these additional transmissions have not been illustrated or described with respect to FIGS. 10A and 10B. In an example, while each queued call message is shown as configured to prompt a conditional QoS allocation by the RAN 120 in FIGS. 10A and 10B, it will be appreciated that less than all of the queued call messages (e.g., only a first queued call message) can be configured in this manner within the transmission queue in other embodiments of the invention. In another embodiment, the first CALL message transmitted in the DoS packet at 812 may also be a configured CALL message, although this configured CALL message will not trigger the RAN 120 to grant QoS if the message header does not contain the UATI assigned in the second serving area.

After receiving the first configured call message in 1016, assume the RAN 120 checks the header portion of the queued, configured call message, extracts the flag and determines to perform the conditional allocation of QoS resources, 1024. Accordingly, in 1024, the RAN 120 determines whether QoS resources have already been allocated to AT 1 for the group communication session. As discussed above, because AT 1 incorrectly used the first UATI for the first serving area when AT 1 was actually in the second serving area, the ReservationOnRequest message from AT 1 was not granted and QoS resources have not yet been allocated to AT 1 for the group communication session. Accordingly, the RAN 120 determines to allocate QoS resources (e.g., a level of QoS known to be negotiated with AT 1, such as in-call and media QoS flows) to AT 1 even though a proper ReservationOnRequest message was not received, and the RAN 120 thereby sends FwdReservationOn and RevReservationOn messages on the F-TCH to AT 1 to notify AT 1 of its QoS resource allocation on the forward and reverse links of the TCH, respectively, in 1026 and 1028. The RAN 120 also forwards the second of the queued, configured call messages (received from AT 1 in 1022) to the application server 170, 1030. AT 1 responds to the FwdReservationOn and RevReservationOn messages with FwdReservationAck and RevReservationAck messages, respectively, over the R-TCH, 1032 and 1034. The RAN 120 receives the ACK from the application server 170 that acknowledges the first of the queued, configured call messages (forwarded in 1018), 1036. The RAN 120 also transmits the ACK to AT 1 on the F-TCH, 1038.

While not illustrated explicitly in FIGS. 10A and 10B, because each call message transmitted from AT 1 is configured to include the flag (e.g., the DSCP flag), the RAN 120 may perform the decision of block 1024 for each queued, configured call message transmitted from AT 1 to the RAN 120. However, only the decision block of 1024 is illustrated in FIGS. 10A and 10B, because the RAN 120 would determine QoS resources to already be allocated to AT 1 after the QoS resource allocation of 1026 and 1028.

Next, the application server 170 sends an ACK for the second queued, configured call message, 1040, and the RAN 120 sends the ACK to AT 1 on the F-TCH, 1042. In response to the announce message of 1020, at least one of ATs 2 . . . N send an ACK that indicates acceptance of the call to the RAN 120 over the reverse link access channel, and the RAN 120 forwards the ACK (accept) to the application server 170, 1044. Upon receiving an ACK (accept) from a first responder to the announced group communication session, the application server 170 sends a STATUS message to the RAN 120 for transmission to AT 1, 1046, and the RAN 120 sends the STATUS message to AT 1 on the F-TCH, 1048.

At the AT 1, as in 958, upon receiving the STATUS message indicating that the group communication session can begin, AT 1 determines whether QoS resources have been allocated for the group communication session, 1050. In this case, because (i) AT 1 does not preemptively fail the call when the QoS timer times out, (ii) AT 1 has configured one or more queued call messages with flags to prompt the RAN 120 to perform conditional QoS allocation evaluations, and (iii) the RAN 120 allocates the QoS resources in 1026 and 1028, AT 1 determines that QoS resources have been allocated for the group communication session in 1050. Accordingly, AT 1 transmits an ACK (accept) message to the RAN 120 via the R-TCH, 1052, and the RAN 120 forwards the ACK (accept) message to the application server 170, 1054. AT 1 can then begin transmitting media associated with the group communication session as an initial floor-holder or call originator, 1056.

As will be appreciated by one of ordinary skill in the art, while the process of FIGS. 10A and 10B reduces the occurrence of call failure as compared to the process of FIGS. 8A and 8B, the implementation of the process of FIGS. 10A and 10B changes operations at each of AT 1 and the RAN 120 (e.g., but not necessarily the application server 170 as in FIGS. 9A and 9B). An embodiment will now be described that involves changes at AT 1 only, and not necessarily to the functionality of the application server 170 and/or the RAN 120, as compared to the process of FIGS. 8A and 8B.

Figure 11A:
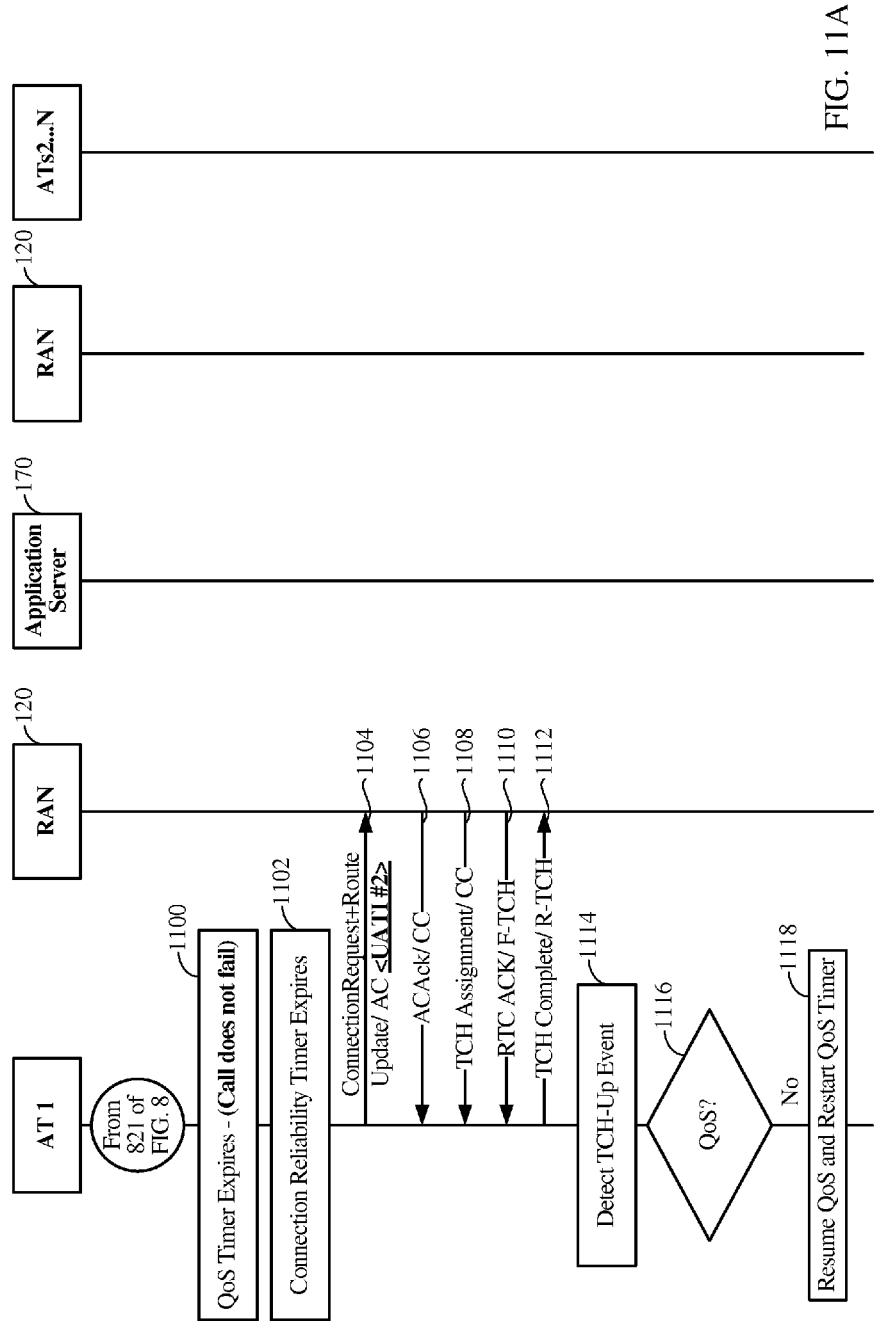

FIGS. 11A and 11B illustrate a communication setup process according to another embodiment of the invention. With respect to FIGS. 11A and 11B, as in FIGS. 9 and 10, assume that FIGS. 8A and 8B begin at 800 and continue through 821.

Next, assume that blocks 1100 through 1112 of FIGS. 10A and 10B correspond to 900 through 912 of FIGS. 9A and 9B and/or 1000 through 1012 of FIGS. 10A and 10B. As such, blocks 1100 through 1112 will not be described further for the sake of brevity. It will be appreciated that the communication-protocol application (e.g., AMSS) is notified when AT 1 is assigned the TCH in 1108 and acknowledges the TCH assignment in 1112. Accordingly, it may be assumed that the communication-protocol application detects the TCH-up event in 1114.

After the communication-protocol application is assigned the TCH in 1108, the communication-protocol application can notify the TCH-detection or TCH-event to the group communication session management application (e.g., QChat client) if the group communication session management application has registered with the communication protocol application (e.g., AMSS) to receive such a notification prior to 1108 (e.g., at the time of loading the group communication session management application). Accordingly, in 1114, the group communication session management application detects the TCH up event in 1114, and the group communication session management application then determines whether QoS resources have already been allocated to AT 1 for the group communication session, 1116. Because a suspended indication has already been received, the QoS resources were not allocated to AT 1. Accordingly, the group communication session management application determines that QoS resources have not yet been allocated to AT 1 for the group communication session.

In 1118, the group communication session management application (e.g., QChat) requests the communication-protocol application (e.g., the AMSS) to resume the QoS acquisition process. The communication-protocol application (e.g., the AMSS) restarts the QoS timer and resumes the QoS acquisition process by scheduling another ReservationOnRequest message for transmission to the RAN 120. Next, since the TCH is up, AT 1 sends a first of the queued call messages on the R-TCH to the RAN 120, 1120, and the RAN 120 forwards the call message to the application server 170, 1122, which generates and sends an announce message ANN for announcing the group communication session to ATs 2 . . . N, 1124. After the first queued call message is transmitted, AT 1 sends a second of the queued call messages to the RAN 120, 1126, which forwards the call message to the application server, 1128. While additional queued call messages may also be transmitted one after the other, for the sake of simplicity these additional transmissions have not been illustrated or described with respect to FIGS. 11A and 11B.

In 1130, AT 1 transmits another ReservationOnRequest message (e.g., with the first ReservationOnRequest message being sent in the bundled packet in 812 of FIGS. 8A and 8B) on the R-TCH to the RAN 120. Unlike the earlier ReservationOnRequest message, the ReservationOnRequest message transmitted in 1130 over the R-TCH that has been established within the second serving area.

Also, the RAN 120 receives the ACK from the application server 170 that acknowledges the first queued call message, 1132, and the RAN 120 transmits the ACK to AT 1 on the F-TCH, 1134. The RAN 120 also responds to the ReservationOnRequest message by allocating AT 1 the requested QoS resources, if available, and thereby sends AT 1 a ReservationAccept message on the F-TCH, 1136.

Next, the application server 170 sends an ACK for the second queued call message, 1138, and the RAN 120 sends the ACK to AT 1 on the F-TCH, 1140. In response to the announce message of 1124, at least one of ATs 2 . . . N send an ACK that indicates acceptance of the call to the RAN 120 over the reverse link access channel, and the RAN 120 forwards the ACK (accept) to the application server 170, 1142. Upon receiving an ACK (accept) from a first responder to the announced group communication session, the application server 170 sends a STATUS message to the RAN 120 for transmission to AT 1, 1144, and the RAN 120 sends the STATUS message to AT 1 on the F-TCH, 1146.

At the AT 1, as in 958 of FIGS. 9A and 9B and/or 1050 of FIGS. 10A and 10B, upon receiving the STATUS message indicating that the group communication session can begin, AT 1 determines whether QoS resources have been allocated for the group communication session, 1148. In this case, because (i) AT 1 does not preemptively fail the call when the QoS timer times out, (ii) AT 1 re-transmits the Reservation-OnRequest message after a TCH-up event such that the RAN 120 allocates the QoS resources in 1136, AT 1 determines that QoS resources have been allocated for the group communication session in 1148. Accordingly, AT 1 transmits an ACK (accept) message to the RAN 120 via the R-TCH, 1150, and the RAN 120 forwards the ACK (accept) message to the application server 170, 1152. AT 1 can then begin transmitting media associated with the group communication session as an initial floor-holder or call originator, 1154.

As will be appreciated by one of ordinary skill in the art, while the process of FIGS. 10A and 10B reduces the occurrence of call failure as compared to the process of FIGS. 8A and 8B, the implementation of the process of FIGS. 10A and 10B changes operations only at AT 1 (e.g., not necessarily the application server 170 and/or RAN 120).

Further, while embodiments of the invention described above include references to "calls", it will be appreciated that the embodiments are intended to cover any type of communication session, and not necessarily call-specific sessions. For example, a data transport session is not necessarily considered to be a call from one party to another party, but data transport sessions are intended to be included within the interpretation of communication session or call in the embodiments disclosed herein.

Further, while the call-flows illustrated in many of the Figures are directed specifically to EV-DO implementations, it will be appreciated that other embodiments of the invention can be directed to other wireless communication protocols (e.g., Yagatta, CDMA, W-CDMA, etc.).

Further, in the embodiments of the invention described above, the QoS-evaluations performed at AT 1 and/or the RAN 120 are described as if QoS is a binary variable (i.e., QoS 'ON' or QoS 'OFF'). For example, in conventional W-CDMA implementations, a single QoS flow is allocated to a communication session, and the single QoS flow can either be 'ON' or 'OFF'. In conventional EV-DO implementations, multiple QoS flows are requested for allocation to a communication session, and if any one of the QoS flows is not granted, the QoS is considered to be 'OFF'.

However, in other embodiments of the invention, different degrees of levels of QoS can be evaluated at AT 1 and/or the RAN 120. For example, in a binary-type implementation, as described above, QoS levels can be negotiated and assigned at the time of powering up the group communication session management application (e.g., QChat client). When a call starts (which is the scenario described in the embodiments above), the group communication session management application asks the RAN 120 to either grant or reject the negotiated QoS. In embodiments of the invention, the lower amount of QoS can be granted as compared to a requested QoS-level, and the call can still be permitted to proceed.

Alternatively, AT 1 can request more than one QoS flow (e.g., as in EV-DO), and the RAN 120 may grant only a partial number of flows. In this sense, the requested QoS may be only made 'partially' available to AT 1 in an example. Unlike the conventional EV-DO implementations, the call may be permitted to continue in this partial-QoS flow scenario in embodiments of the invention. For example, the RAN 120 may grant QoS flows in the forward direction and reject flows in the reverse direction. Based on such an allocation, the group communication session management application may decide to ACK (accept) the STATUS and later re-request the flows in the reverse direction. In other words, the decision blocks of 958 of FIGS. 9A and 9B, 1050 of FIGS. 10A and 10B and/or 1148 of FIGS. 11A and 11B can evaluate whether a sufficient level of QoS resources have been obtained (e.g., forward link QoS flow where reverse link QoS flow is less important for a half-duplex call target, reverse link QoS flow where forward link QoS flow is less important for a half-duplex call originator or floor-holder, etc.), instead of whether all requested QoS has been obtained.

Further, while the mechanism by which AT 1 or the application server 170 triggers the conditional allocation of QoS resources in FIGS. 9A, 9B, 10A and 10B is described in the above-embodiments as a specially-configured DSCP configuration in a packet header (e.g., of a call packet, an ACK packet or a STATUS packet), it will be appreciated that other embodiments of the invention can be directed towards other mechanisms for instructing the RAN 120 to perform the conditional allocation of QoS resources, and need not specifically be the DSCP field of the packet. Likewise, while FIGS. 9A and 9B describes both call message-ACK and STATUS packets as including the modified DSCP field as a flag, it will be appreciated that other embodiments can include the flag in either of these packets, but not necessarily both. In other embodiments, packets exchanged after the STATUS message may be configured to trigger the conditional allocation of QoS resources. For example, if QoS allocation (i.e., Fwd/RevReservationOn messages) are not sent from the RAN 120 until after the STATUS message is sent to AT 1, the call can proceed and QoS can be set-up in-call.

The embodiments described above with respect to FIGS. 9A-11B have generally been directed to setting up a new call that requires QoS resources. As will be described below with respect to FIG. 12, if set-up for a new call begins before the QoS resources for a current call are released, such as when the new call occurs back-to-back or immediately upon termination of the current call, difficulties can arise during the set-up for the new call. Accordingly, another embodiment of the invention, described below with respect to FIGS. 13A and 13B is directed to setting-up the new call immediately after the current call is terminated.

Figure 12:
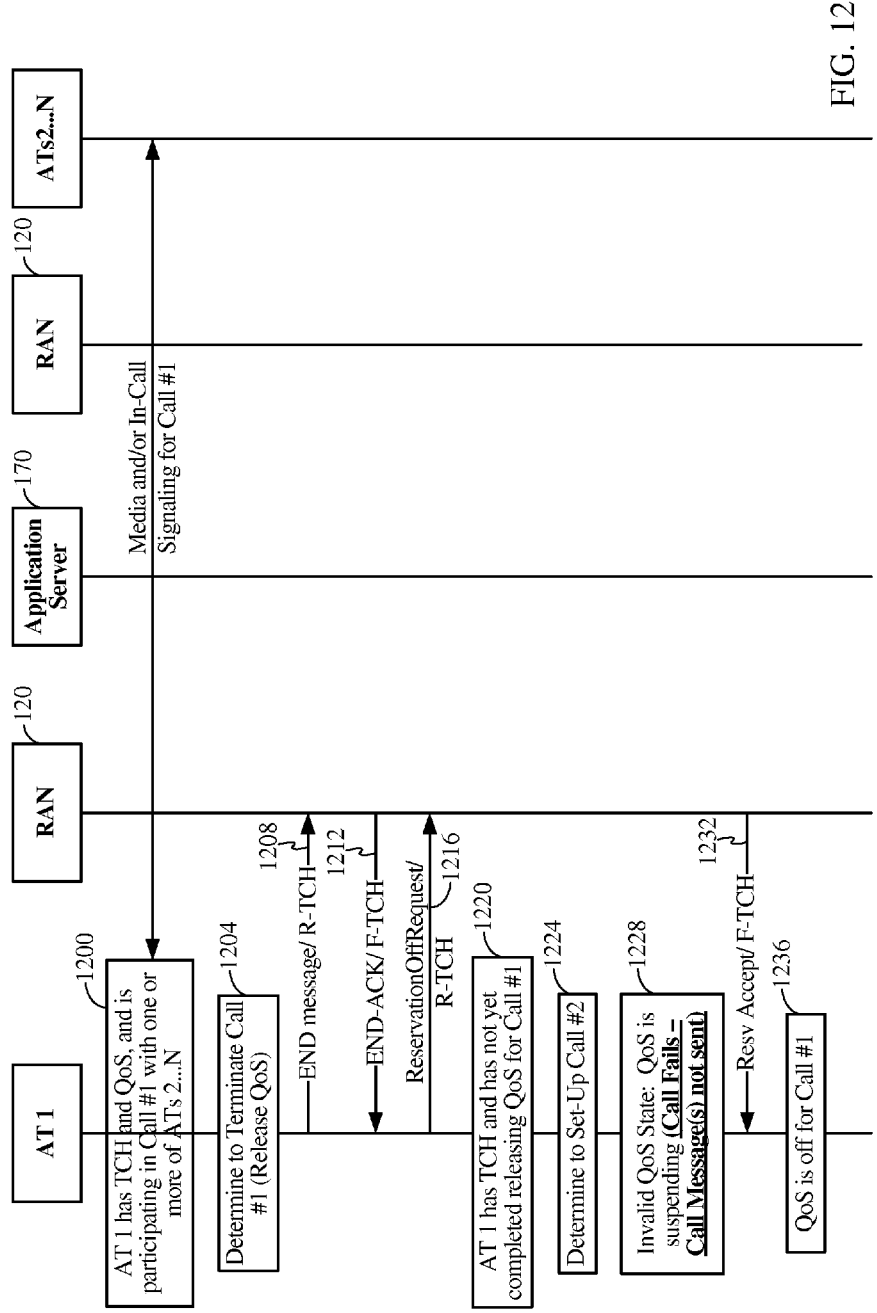
FIG. 12 and FIGS. 13A and 13B each illustrate a setup process for a second of back-to-back communication sessions according to different embodiments of the invention.
Figure 13A:
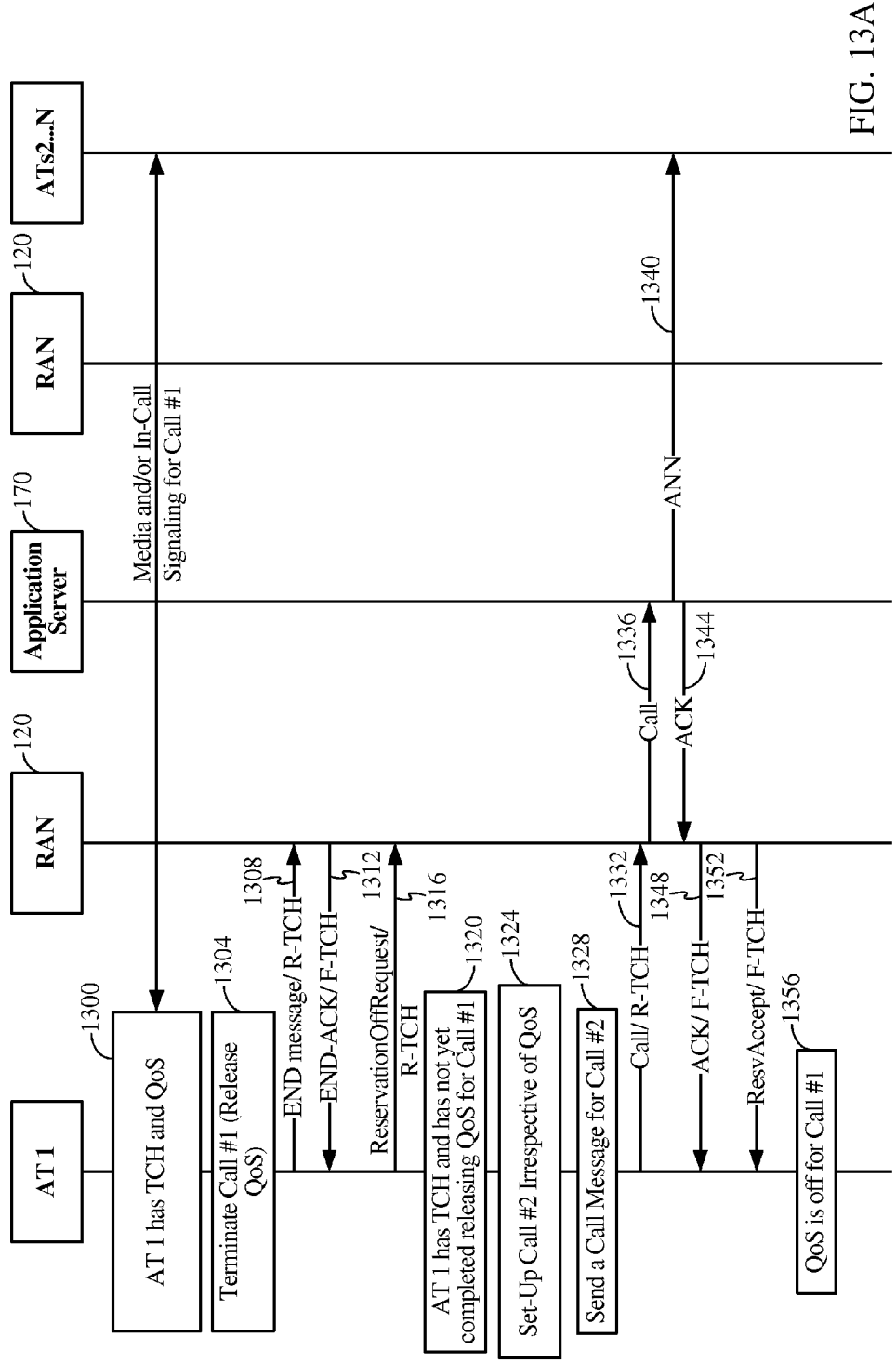
Figure 13B:
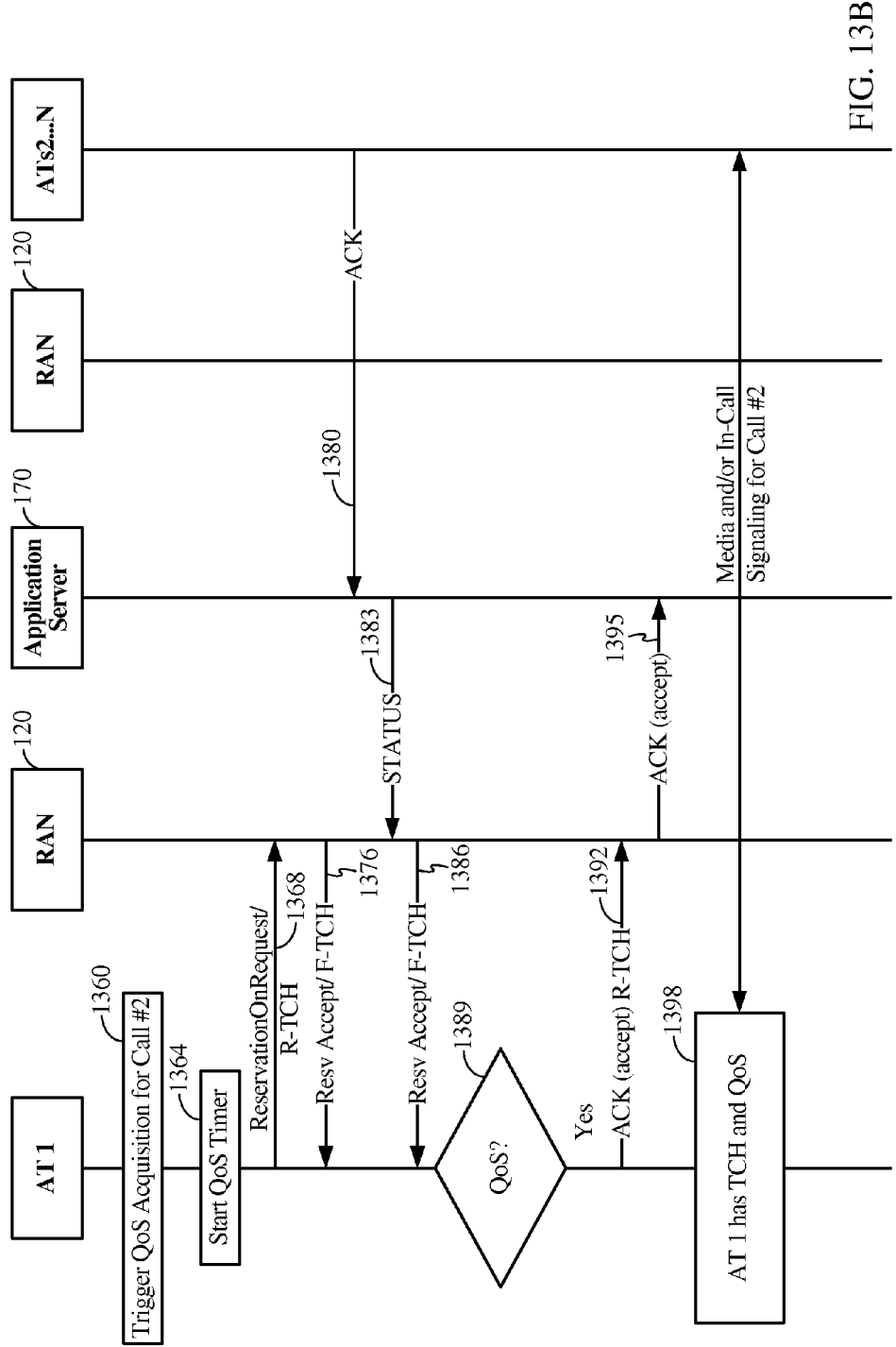

Referring to FIG. 12, assume that AT 1 has a TCH and has a given level of QoS resources, and that AT 1 is using these call-resources in a first call to one or more of ATs 2 ... N, 1200. Accordingly, in 1200, media and/or in-call signaling is being exchanged between AT 1 and the other call participants among ATs 2 ... N. In an example, while not shown explicitly within FIG. 12, the first call can be set-up in accordance with any of FIGS. 9A-11B.

Next, AT 1 determines to terminate its participation in the first call, 1204. For example, the determination of 1204 can be responsive to a user of AT 1 pressing an "END" button on AT 1. Accordingly, AT 1 sends an END message on the R-TCH to the RAN 120. 1208, and the RAN 120 acknowledges AT 1's request to end its participation in the first call by sending an END-ACK on the F-TCH to AT 1, 1212. AT 1 continues its call termination process for the first call by sending a ReservationOffRequest on the R-TCH to the RAN 120 to request that the RAN 120 tear down or release AT 1's QoS resources for the first call, 1216.

At this point, AT 1 still has its TCH and has not yet completed relinquishing its QoS resources because no response to the ReservationOffRequest message of 1216 has been received from the RAN 120, 1220. During this state before the RAN 120 responds to the ReservationOffRequest message, assume that AT 1 determines to set-up a second call, 1224. For example, the determination of 1224 can be responsive to a user of AT 1 requesting initiation of a new call on AT 1.

In this case, the group communication session management application will not typically permit AT 1 to set up the second call because AT 1's QoS resources are currently in a suspending state, which is an invalid state for resuming QoS acquisition, 1228. In other words, the group communication session management application knows that tear-down of its 'old' QoS resources for the first call are imminent, while at the same time the group communication session management application is not permitted to request 'new' QoS resources for the second call because the RAN 120 has not yet acknowledged that the 'old' QoS resources for the second call have been turned off. Accordingly, the group communication session management application simply fails the attempt to initiate the second call in 1228.

Eventually, the RAN 120 sends the ReservationAccept message on the F-TCH to AT 1 to confirm that the QoS resources for the first call are turned off, 1232, after which AT 1 becomes aware that it no longer has QoS resources for the first call, 1236. At this point, while not shown in FIG. 12, the user of AT 1 can manually request initiation of the second call again.

As will be appreciated by one of ordinary skill in the art, the user experience in FIG. 12 is degraded because the user of AT 1 experiences call failure for his/her attempt to set-up the second call. FIGS. 13A and 13B is directed to an embodiment whereby a back-to-back call can be set-up without call failure even during the invalid QoS state discussed above with respect to FIG. 12.

Referring to FIGS. 13A and 13B, 1300 through 1320 correspond to 1200 through 1220 of FIG. 12, respectively, and as such will not be described further for the sake of brevity. Next, unlike 1220 of FIG. 12, in 1324, AT 1 determines to attempt set-up for the second call irrespective of whether AT 1 has obtained QoS resources for the second call. For example, proceeding with set-up for a call irrespective of QoS resources can allow QoS resources to be established at a later point during the call, a lower-level of QoS resources can be allocated to AT 1 for the call, the call can continue with no QoS resources, etc.

Accordingly, the group communication session management application adds a call message to the transmission queue of the communication-protocol application, 1328, and AT 1 transmits the call message on the R-TCH to the RAN 120, 1332. As will be appreciated, the call message transmitted in 1332 is not followed by a ReservationOnRequest message because of the invalid QoS state of AT 1 at this point. In other words, the ReservationOnRequest message to obtain QoS resources for the second call is not permitted to be sent until the RAN 120 accepts the tear-down of the old QoS resources for the first call. However, AT 1 can still proceed with the set-up for the second call by transmitting the call message in 1332 before the QoS can be requested. Also, the call message of 1332 need not be sent on the reverse-link access channel in a DoS message because AT 1 still has its TCH from the first call, and as such can simply use its R-TCH for transmitting the call messages to the RAN 120 for quicker transmission. The higher reliability of the TCH as compared to a reverse-link shared channel or access channel can also permit AT 1 to send only one call message in at least one embodiment, as shown in FIGS. 13A and 13B.

Thus, the RAN 120 receives the call message on the R-TCH from AT 1 in 1332, and the RAN 120 forwards the call message to the application server 170, 1336. The application server 170 forwards an announce message to the RAN 120 for transmission to ATs 2 . . . N, 1340. The application server 170 responds to the call message with an ACK in 1344, which is transmitted to AT 1 on the F-TCH by the RAN 120, 1348.

At this point, assume that the RAN 120 responds to the ReservationOffRequest message that is sent by AT 1 in 1316 by sending a ReservationAccept message on the F-TCH, 1352. At this point, the group communication session management application is notified by the communication-protocol application that the QoS resources for the first call have been turned off or canceled, 1356. This event causes the group communication session management application to trigger QoS resource-acquisition for the second call, which was delayed due to the invalid QoS state up to this point, 1360. Accordingly, the group communication session management application requests the communication-protocol application (e.g., the AMSS) to resume QoS acquisition. The communication protocol application (e.g., the AMSS) starts a QoS timer, 1364, and transmits the ReservationOnRequest message on the R-TCH in order to obtain the QoS resources for the second call, 1368. The RAN 120 sends a ReservationAccept message to AT 1 on the F-TCH to notify AT 1 that its QoS resources for the second call have been reserved, 1376. In an example, the ReservationAccept message of 1376 can function as an implicit ACK to the ReservationOnRequest message from 1368, such that a separate ACK to the ReservationOnRequest message need not be sent.

Upon receiving an ACK (accept) message from a first responder to the announced group communication session (i.e., the second call), 1380, the application server 170 sends a STATUS message to the RAN 120 for transmission to AT 1, 1383, and the RAN 120 transmits the STATUS message to AT 1 on the F-TCH, 1386. Upon receiving the STATUS message, AT 1 determines whether sufficient QoS resources have been allocated for the second call, 1389. In this case, because the QoS resources for the second call are allocated in 1376, AT 1 transmits an ACK that accepts the call on the R-TCH, 1392, and the RAN 120 forwards the ACK (accept) to the application server 170, 1395. Thereafter, media and/or in-call signaling is being exchanged between AT 1 and the other call participants among ATs 2 . . . N during the second call, 1398.

In the embodiment of FIGS. 13A and 13B, the ReservationAccept message of 1376 arrives at AT 1 before the STATUS message of 1386. In an alternative embodiment, the STATUS message can arrive at AT 1 before the ReservationAccept message. In this case, instead of failing the call because QoS resources are not yet available when the STATUS message arrives at AT 1, AT 1 can wait a given amount of time to receive the ReservationAccept message. When the ReservationAccept message finally arrives, the process of FIGS. 13A and 13B can continue with the ACK (accept) message being sent in 1392.

In other embodiments, described below with respect to FIGS. 15A and 15B, if a call has ended and QoS is in a suspending state and an AT receives an announce (ANN) message and predictive QoS has failed or is unavailable, the same procedure of waiting for the reservation to turn off before sending a request to turn on QoS and then waiting for the reservation accept before ACKing the ANN can be applied to prevent the call from failing because QoS was in a suspending state.

Referring to FIG. 14, 1400 through 1420 correspond to 1200 through 1220 of FIG. 12, respectively, and as such will not be described further for the sake of brevity. Next, instead of AT 1 determining to initiate a subsequent or back-to-back communication session, in 1424, one of ATs 2 . . . N determines to initiate another communication session and thereby sends a call message to the application server 170, which is ACKed by the application server 170 in 1428. The application server 170 then announces the communication session at least to AT 1 by sending an announce (ANN) message, 1432.

In this case, the group communication session management application will not typically permit AT 1 to set up the second call because AT 1's QoS resources are currently in a suspending state, which is an invalid state for resuming QoS acquisition, 1428. In other words, the group communication session management application knows that tear-down of its 'old' QoS resources for the first call are imminent, while at the same time the group communication session management application is not permitted to request 'new' QoS resources for the second call because the RAN 120 has not yet acknowledged that the 'old' QoS resources for the second call have been turned off.

Accordingly, the group communication session management application simply fails the attempt to initiate the second call in 1428. AT 1 thereby sends an ACK (reject) message to the RAN 120 on the R-TCH, 1432 which is forwarded to the application server 170, 1436. The application server 170 determines AT 1 cannot join the session due to the ACK (reject) message, and sends a STATUS (failure) message to AT 2, 1440. Eventually, the RAN 120 sends the ReservationAccept message on the F-TCH to AT 1 to confirm that the QoS resources for the first call are turned off, 1444, after which AT 1 becomes aware that it no longer has QoS resources for the first call, 1448.

As will be appreciated by one of ordinary skill in the art, the user experience in FIG. 14 is degraded because the user of ATs 1 ... N because both the call originator and call target (i.e., AT 1) experience call failure for the second call. FIGS. 15A and 15B are directed to an embodiment whereby a back-to-back call can be set-up without call failure even during the invalid QoS state discussed above with respect to FIG. 14.

Referring to FIGS. 15A and 15B, 1500 through 1532 correspond to 1400 through 1432 of FIG. 14, respectively, and as such will not be described further for the sake of brevity. Next, unlike 1428 of FIG. 14, in 1536, AT 1 determines to attempt set-up for the second call irrespective of whether AT 1 has obtained QoS resources for the second call. For example, proceeding with set-up for a call irrespective of QoS resources can allow QoS resources to be established at a later point during the call, a lower-level of QoS resources can be allocated to AT 1 for the call, the call can continue with no QoS resources, etc.

Accordingly, the group communication session management application determines to wait for the QoS resources for the first call to be relinquished instead of simply failing the second call due to the invalid QoS state in 1536. In other words, the ReservationOnRequest message to obtain QoS resources for the second call is not permitted to be sent until the RAN 120 accepts the tear-down of the old QoS resources for the first call.

Eventually, assume that the RAN 120 responds to the ReservationOffRequest message that is sent by AT 1 in 1516 by sending a ReservationAccept message on the F-TCH, 1540. At this point, the group communication session management application is notified by the communication-protocol application that the QoS resources for the first call have been turned off or canceled, 1544. This event causes the group communication session management application to trigger QoS resource-acquisition for the second call, which was delayed due to the invalid QoS state up to this point, 1548. Accordingly, the group communication session management application requests the communication-protocol application (e.g., the AMSS) to resume QoS acquisition. The communication protocol application (e.g., the AMSS) starts a QoS timer, 1552, and transmits the ReservationOnRequest message on the R-TCH in order to obtain the QoS resources for the second call, 1556. The RAN 120 sends a ReservationAccept message to AT 1 on the F-TCH to notify AT 1 that its QoS resources for the second call have been reserved, 1560. In an example, the ReservationAccept message of 1560 can function as an implicit ACK to the ReservationOnRequest message from 1556, such that a separate ACK to the ReservationOnRequest message need not be sent.

At this point, the group communication session management application determines both QoS resources and the TCH for the second call to be established, and thereby sends the ACK (accept) message to the announce (ANN) message from 1532 to the RAN 120, 1564, which is forwarded to the application server, 1568. Upon receiving an ACK (accept) message from a first responder (i.e., AT 1) to the announced group communication session (i.e., the second call), the application server 170 sends a STATUS message to AT 2 to begin the second call, 1572, and AT 2 ACKs the STATUS message, 1576. Thereafter, media and/or in-call signaling is being exchanged between AT 1 and the other call participants among ATs 2 ... N during the second call, 1584.

Figure 15A:
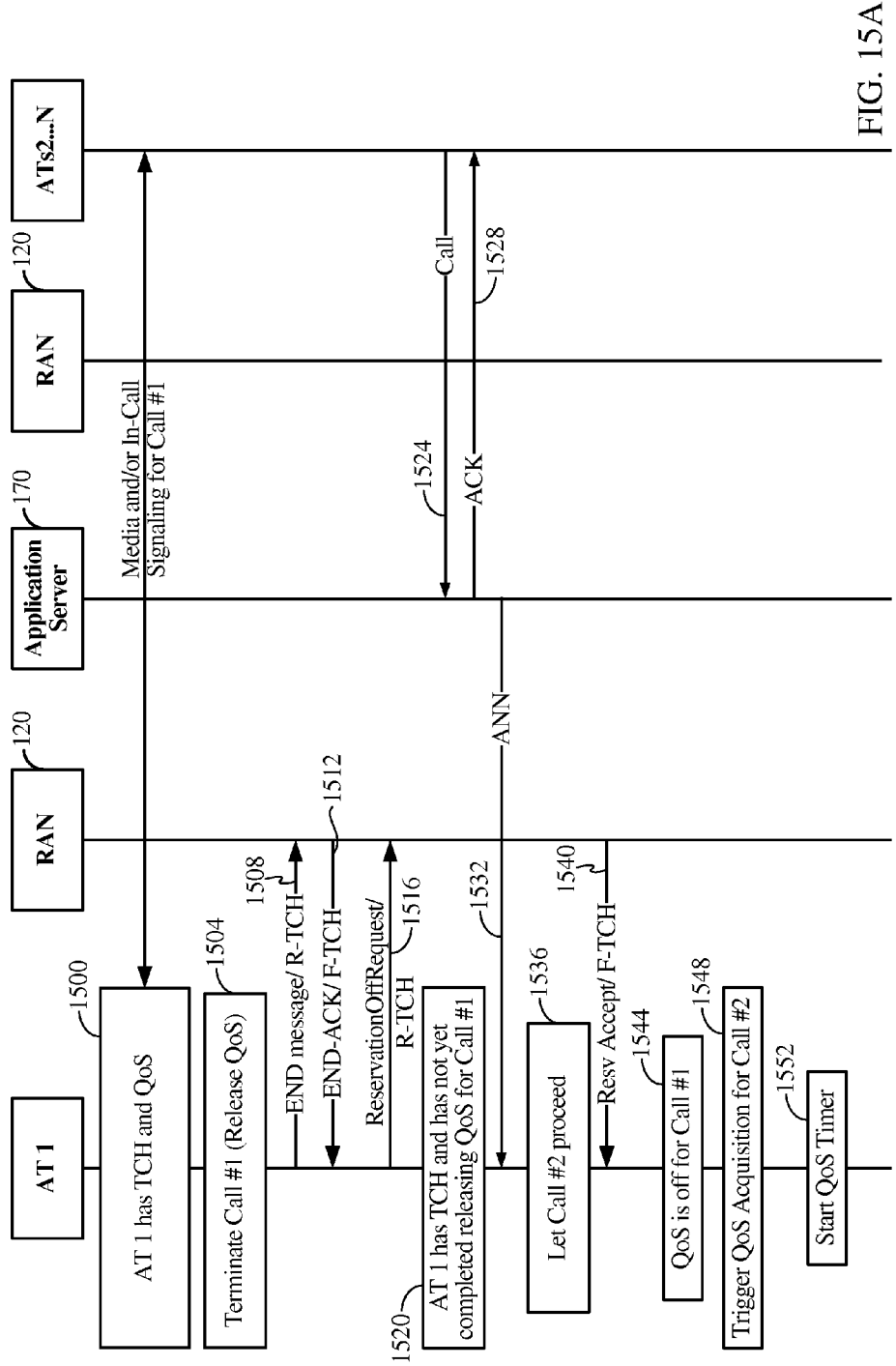
Figure 15B:
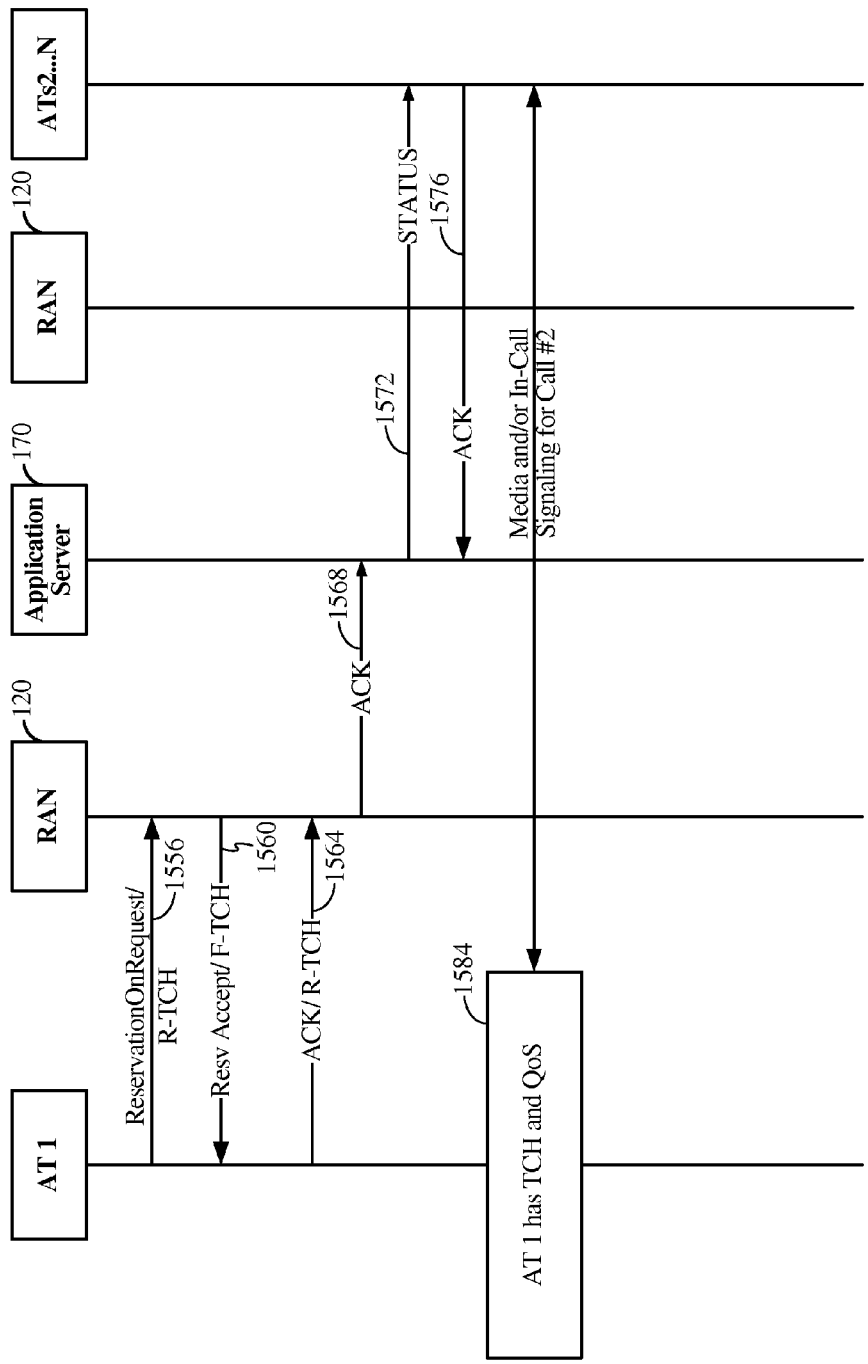

Further, while the embodiment of FIGS. 15A and 15B shows AT 1 determining to terminate the first call in 1504 and sending the END message to the RAN 120 in 1508, in an alternative embodiment, the END message can be sent from the RAN 120 to AT 1 (i.e., the access network initiates the session's termination for AT 1). In this case, AT 1 determines to end the first call based on receipt of the END message instead of making its own independent decision to terminate the session, or having a user of AT 1 instruct AT 1 to end the session.

Those of skill in the art will appreciate that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Further, those of skill in the art will appreciate that the various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

The various illustrative logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The methods, sequences and/or algorithms described in connection with the embodiments disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a user terminal (e.g., access terminal). In the alternative, the processor and the storage medium may reside as discrete components in a user terminal.

In one or more exemplary embodiments, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media.

Accordingly, an embodiment of the invention can include a computer-readable medium including code stored thereon for bundling communication messages in a wireless network comprising: code for causing a computer to bundle a connection request and a reservation for QoS resources into an access message, and code for causing a computer to transmit the access message to an access network. Further, any of the functions describe herein can be included in as additional code in further embodiments of the invention.

While the foregoing disclosure shows illustrative embodiments of the invention, it should be noted that various changes and modifications could be made herein without departing from the scope of the invention as defined by the appended claims. The functions, steps and/or actions of the method claims in accordance with the embodiments of the invention described herein need not be performed in any particular order. Furthermore, although elements of the invention may be described or claimed in the singular, the plural is contemplated unless limitation to the singular is explicitly stated.

What is claimed is:

1. A method of setting up a group communication session requiring Quality of Service (QoS) resources at an access terminal within a wireless communications system, comprising:
    sending a request, within a second serving area, for QoS resources, the request for QoS resources based at least in part on a first access terminal identifier that identifies the access terminal within a first serving area that is separate from the second serving area;
    sending a call message, within the second serving area, that requests set-up of the group communication session by an application server, the call message based at least in part on a second access terminal identifier that identifies the access terminal within the second serving area; and
    receiving an allocation of the requested QoS resources within the second serving area in response to the call message.

2. The method of claim 1, wherein the receiving receives the allocation of the requested QoS resources before a STATUS message is received at the access terminal, the STATUS message indicating to the access terminal that the group communication session can begin.

3. The method of claim 1, wherein the receiving receives the allocation of the requested QoS resources after a STATUS message is received at the access terminal, the STATUS message indicating to the access terminal that the group communication session can begin.

4. The method of claim 1, further comprising:
    configuring the call message to include a flag,
    wherein the receiving receives the QoS resource allocation from an access network, and the QoS resource allocation is triggered by the flag contained in the call message.

5. The method of claim 4, wherein the flag corresponds to a Diffserv Code Point (DSCP) value contained in a header portion of the call message.

6. The method of claim 4, wherein the flag contains a value configured to indicate, to the access network, to allocate QoS resources to an originator of the call message.

7. The method of claim 1, wherein the group communication session corresponds (i) to a call between the access terminal and one other access terminal, or (ii) to a call between the access terminal and two or more other access terminals.

8. The method of claim 1, wherein the receiving receives the QoS resource allocation from an access network, and the QoS resource allocation is triggered by a flag contained in a message that originates at the application server that is configured to arbitrate the group communication session.

9. The method of claim 8, wherein the flagged message corresponds to a first message acknowledging the call message or a second message configured to indicate, to the access terminal, that the group communication session can begin.

10. The method of claim 8, wherein the flag contains a value configured to indicate, to the access network, to allocate QoS resources to a destination or target of the flagged message.

11. The method of claim 8, wherein the flag corresponds to a Diffserv Code Point (DSCP) value contained in a header portion of the flagged message.

12. The method of claim 1, further comprising:
    determining that the request for QoS resources has failed;
    determining not to fail the group communication session attempt even though the request for QoS resources is determined to have failed; and
    performing the sending the call message after the determining not to fail.

13. The method of claim 12, wherein the determining that the request for QoS resources has failed is based on an expiration of a timer or a message indicating failure for the request for QoS resources.

14. The method of claim 1, further comprising:
sending an identifier request to obtain the second access terminal identifier;
receiving, in response to the identifier request, an assignment message assigning the second access terminal identifier,
wherein the sending the request is performed before the second access terminal identifier is assigned, and the sending the call message is performed after the second access terminal identifier is assigned.

15. The method of claim 1, wherein the first and second access terminal identifiers correspond to Unicast Access Terminal Identifiers (UATIs).

16. The method of claim 1, wherein the first and second serving areas correspond to different cells or sectors within the wireless communications system.

17. The method of claim 1, wherein the request for QoS resources corresponds to a bundled message including a ReservationOnRequest message, a data-over-signaling (DoS) message, a ConnectionRequest message and a RouteUpdate message.

18. The method of claim 1, wherein the request for QoS resources corresponds to a non-bundled ReservationOnRequest message.

19. An access terminal configured to set-up a group communication session requiring Quality of Service (QoS) resources within a wireless communications system, comprising:
means for sending a request, within a second serving area, for QoS resources, the request for QoS resources based at least in part on a first access terminal identifier that identifies the access terminal within a first serving area that is separate from the second serving area;
means for sending a call message, within the second serving area, that requests set-up of the group communication session by an application server, the call message based at least in part on a second access terminal identifier that identifies the access terminal within the second serving area; and
means for receiving an allocation of the requested QoS resources within the second serving area in response to the call message.

20. The access terminal of claim 19, further comprising:
means for configuring the call message to include a flag,
wherein the means for receiving receives the QoS resource allocation from an access network, and the QoS resource allocation is triggered by the flag contained in the call message.

21. The access terminal of claim 19, wherein the means for receiving receives the QoS resource allocation from an access network, and the QoS resource allocation is triggered by a flag contained in a message that originates at the application server that is configured to arbitrate the group communication session.

22. The access terminal of claim 19, further comprising:
means for determining that the request for QoS resources has failed;
means for determining not to fail the group communication session attempt even though the request for QoS resources is determined to have failed; and
means for performing the sending the call message after the means for determining not to fail determines not to fail the group communication session.

23. An access terminal configured to set-up a group communication session requiring Quality of Service (QoS) resources within a wireless communications system, comprising:
logic configured to send a request, within a second serving area, for QoS resources, the request for QoS resources based at least in part on a first access terminal identifier that identifies the access terminal within a first serving area that is separate from the second serving area;
logic configured to send a call message, within the second serving area, that requests set-up of the group communication session by an application server, the call message based at least in part on a second access terminal identifier that identifies the access terminal within the second serving area; and
logic configured to receive an allocation of the requested QoS resources within the second serving area in response to the call message.

24. The access terminal of claim 23, further comprising:
logic configured to configure the call message to include a flag,
wherein the logic configured to receive receives the QoS resource allocation from an access network, and the QoS resource allocation is triggered by the flag contained in the call message.

25. The access terminal of claim 23, wherein the logic configured to receive receives the QoS resource allocation from an access network, and the QoS resource allocation is triggered by a flag contained in a message that originates at the application server that is configured to arbitrate the group communication session.

26. The access terminal of claim 23, further comprising:
logic configured to determine that the request for QoS resources has failed;
logic configured to determine not to fail the group communication session attempt even though the request for QoS resources is determined to have failed; and
logic configured to perform the sending the call message after the logic configured to determine not to fail determines not to fail the group communication session.

27. A non-transitory computer-readable storage medium including instructions stored thereon, which, when executed by an access terminal configured to set-up a group communication session requiring Quality of Service (QoS) resources within a wireless communications system, causes the access terminal to perform operations, the instructions comprising:
program code to send a request, within a second serving area, for QoS resources, the request for QoS resources based at least in part on a first access terminal identifier that identifies the access terminal within a first serving area that is separate from the second serving area;
program code to send a call message, within the second serving area, that requests set-up of the group communication session by an application server, the call message based at least in part on a second access terminal identifier that identifies the access terminal within the second serving area; and
program code to receive an allocation of the requested QoS resources within the second serving area in response to the call message.

28. The non-transitory computer-readable storage medium of claim 27, further comprising:
program code to configure the call message to include a flag, wherein the program code to receive receives the QoS resource allocation from an access network, and the QoS resource allocation is triggered by the flag contained in the call message.

29. The non-transitory computer-readable storage medium of claim 27, wherein the program code to receive receives the QoS resource allocation from an access network, and the QoS resource allocation is triggered by a flag contained in a message that originates at the application server that is configured to arbitrate the group communication session.

30. The non-transitory computer-readable storage medium of claim 27, further comprising:
   program code to determine that the request for QoS resources has failed;
   program code to determine not to fail the group communication session attempt even though the request for QoS resources is determined to have failed; and
   program code to perform the sending the call message after the program code to determine not to fail determines not to fail the group communication session.

* * * * *